Aug. 26, 1930.  G. S. COX ET AL  1,773,723
DISPENSING DEVICE
Filed Nov. 5, 1928  19 Sheets-Sheet 2
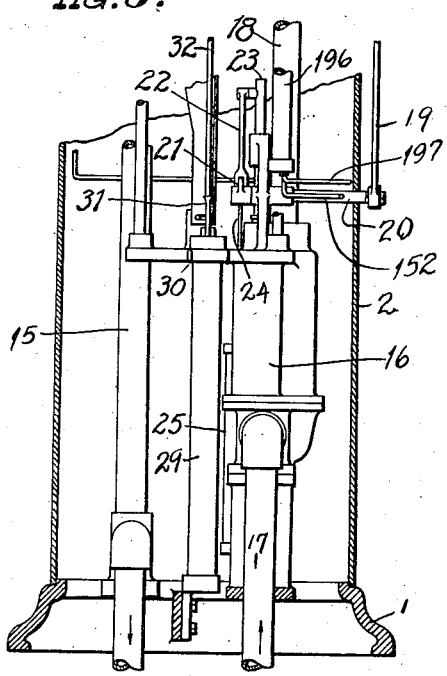
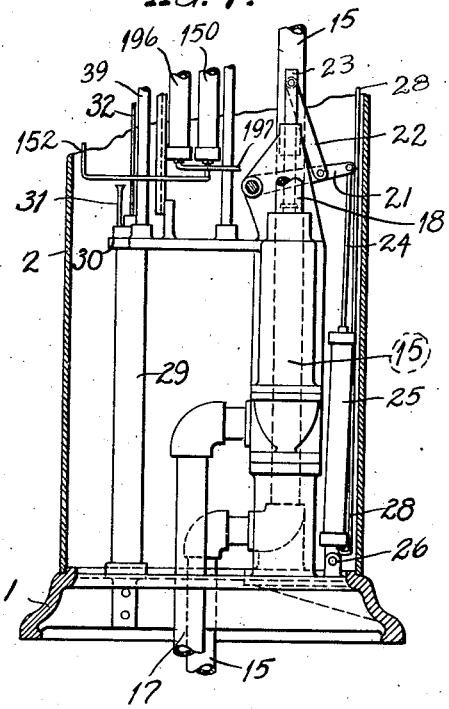
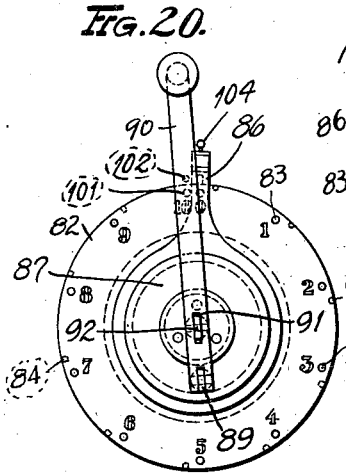
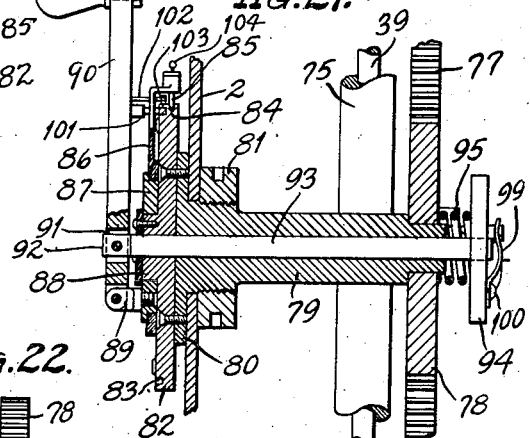
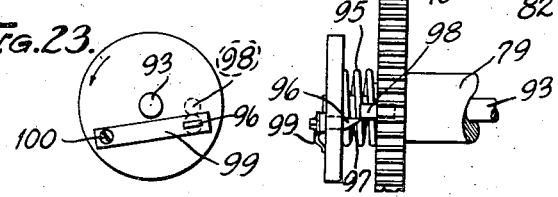
INVENTORS
GEORGE S. COX
HARRY J. ALMSTEDT
By Edward E. Logan
ATTORNEY Aug. 26, 1930.   G. S. COX ET AL   1,773,723
DISPENSING DEVICE
Filed Nov. 5, 1928    19 Sheets-Sheet 3

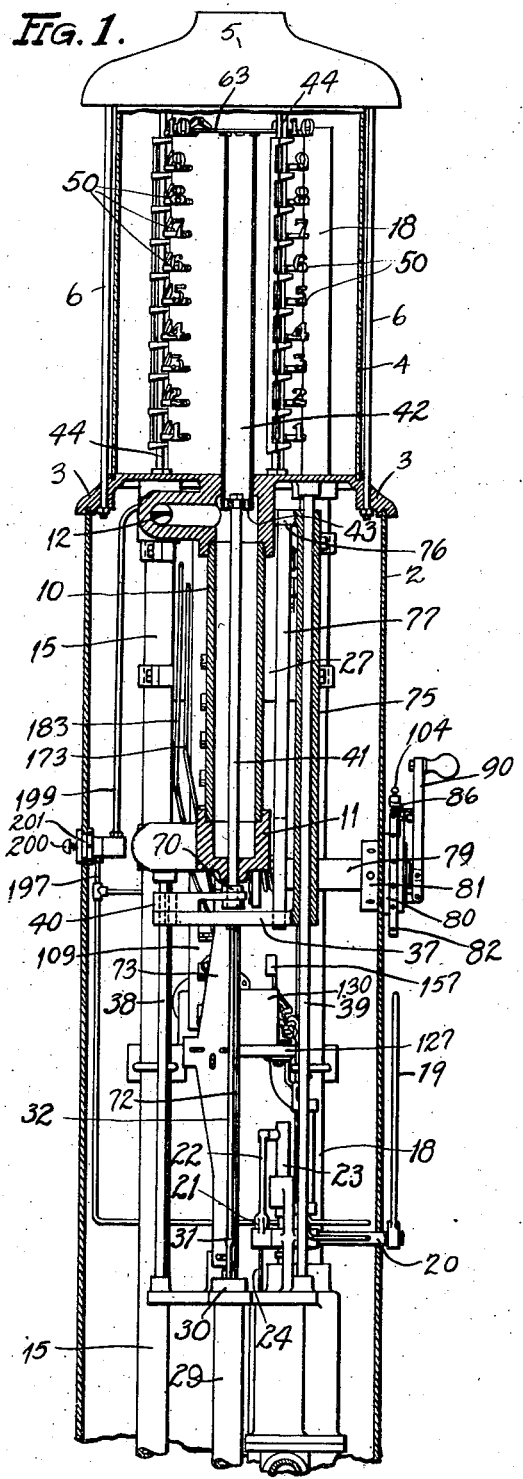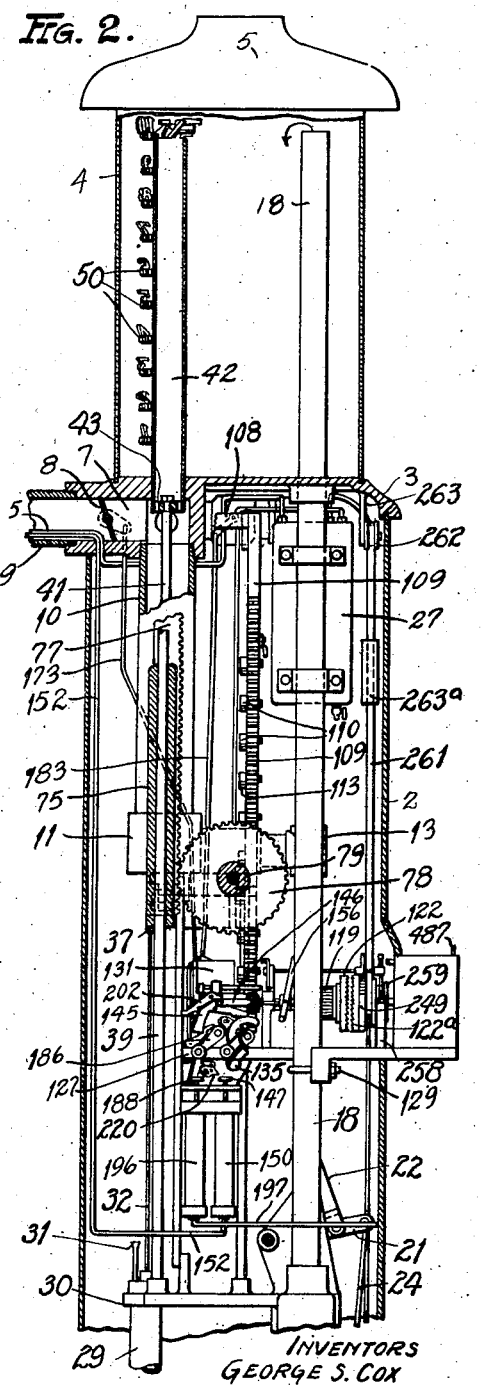

INVENTORS
GEORGE S. COX.
HARRY J. ALMSTEDT
BY Edward E. Logan
ATTORNEY

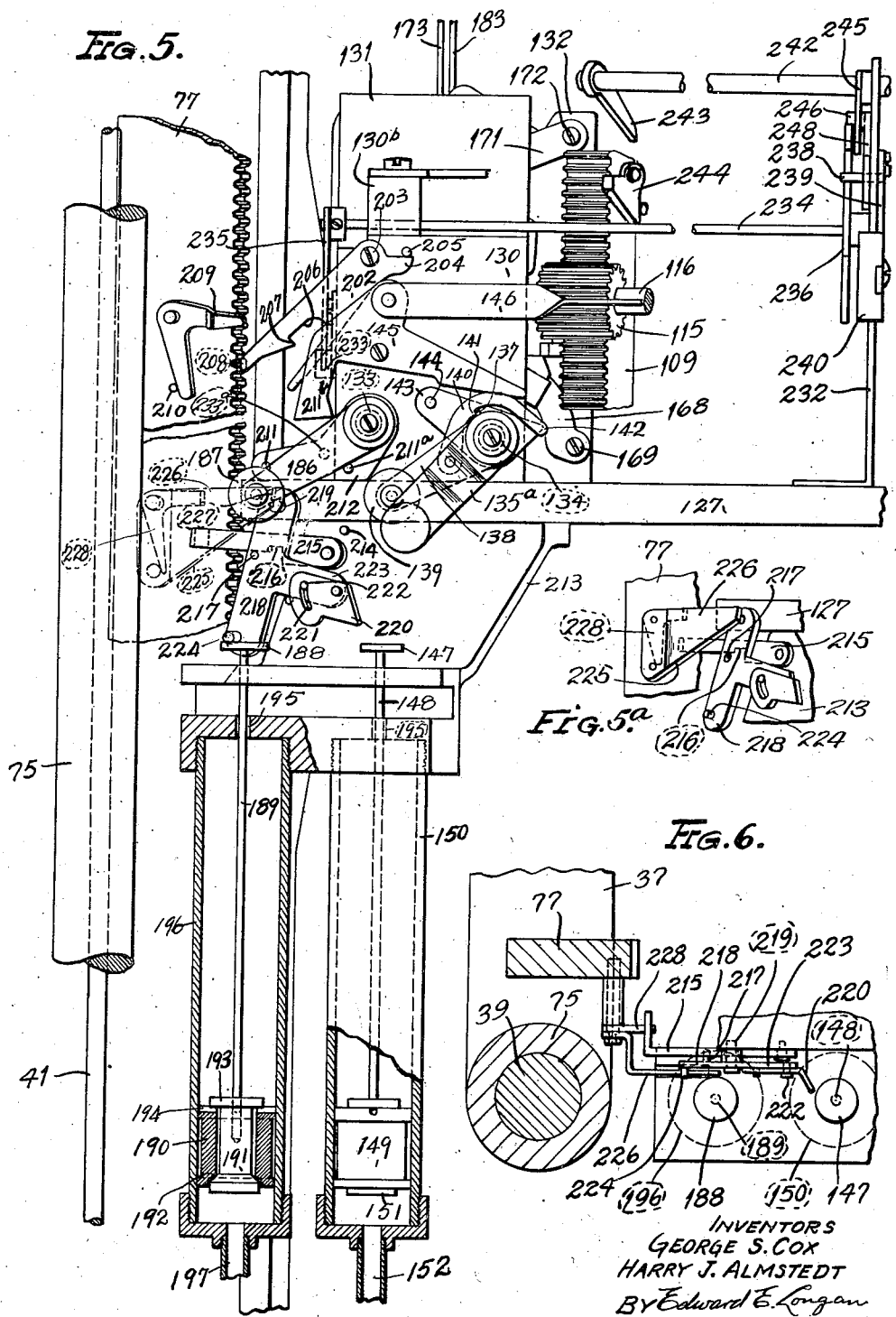

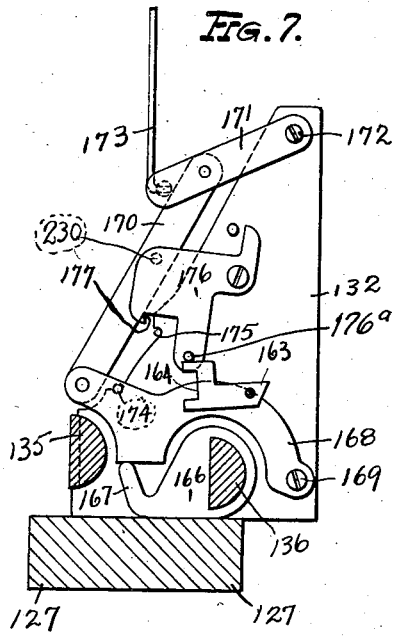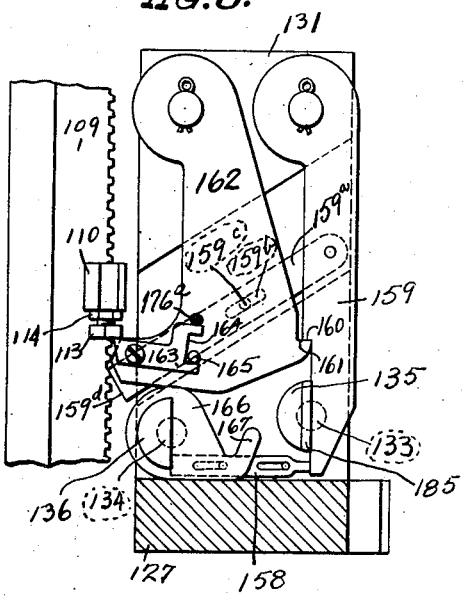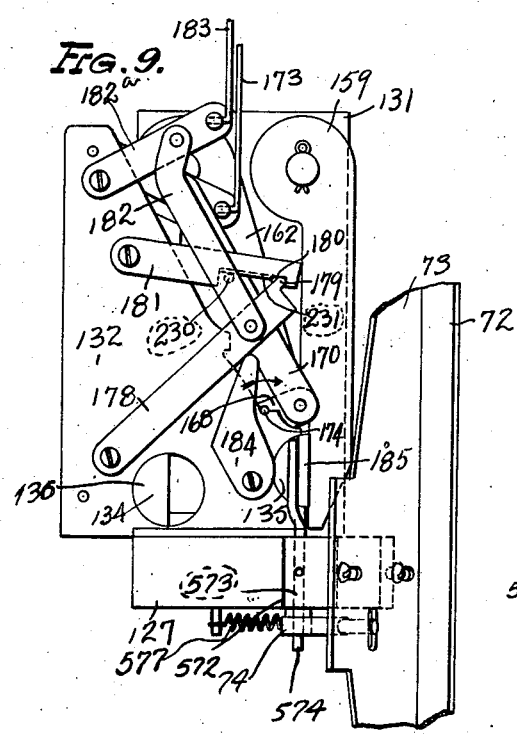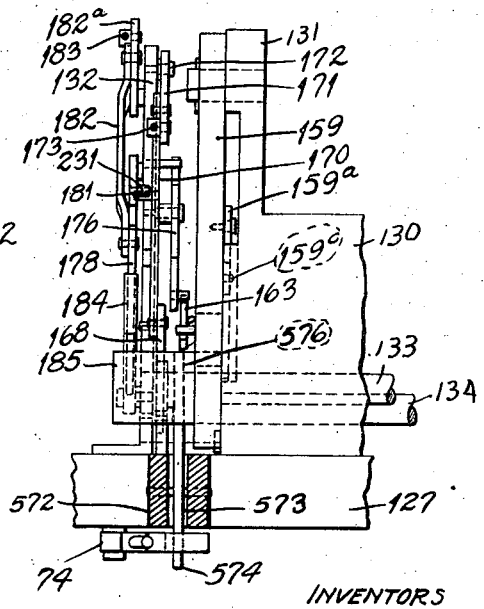

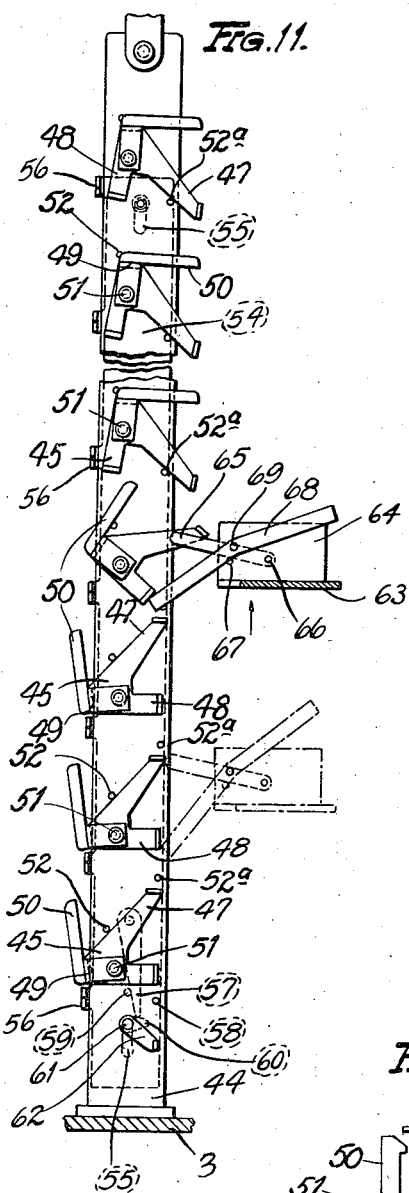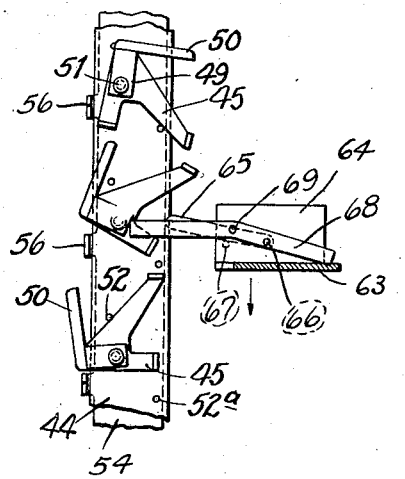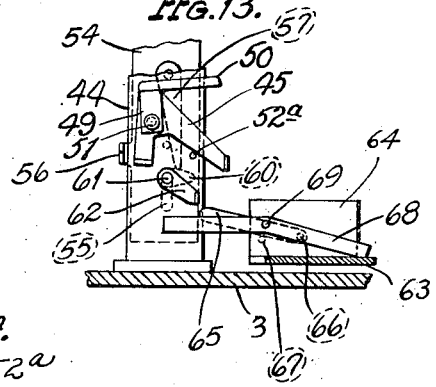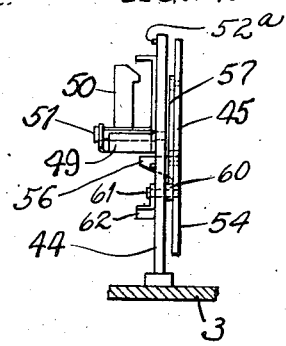

Aug. 26, 1930.   G. S. COX ET AL   1,773,723
DISPENSING DEVICE
Filed Nov. 5, 1928   19 Sheets-Sheet 7

INVENTORS
GEORGE S. COX
HARRY J. ALMSTEDT
By Edward E. Longan
ATTORNEY

Aug. 26, 1930.  G. S. COX ET AL  1,773,723
DISPENSING DEVICE
Filed Nov. 5, 1928   19 Sheets-Sheet 8
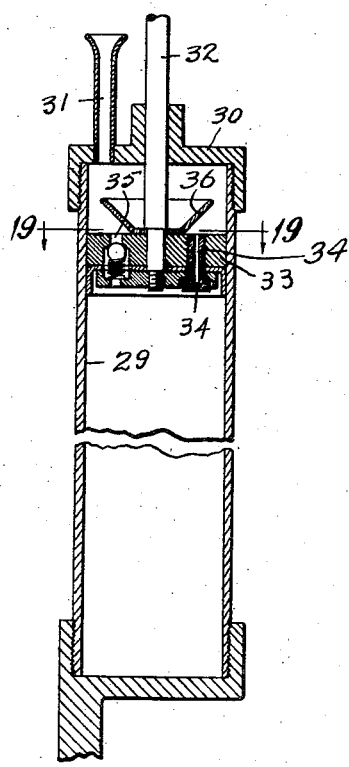
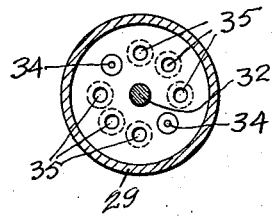
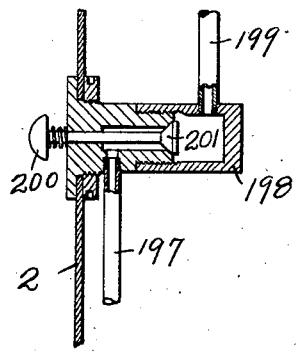
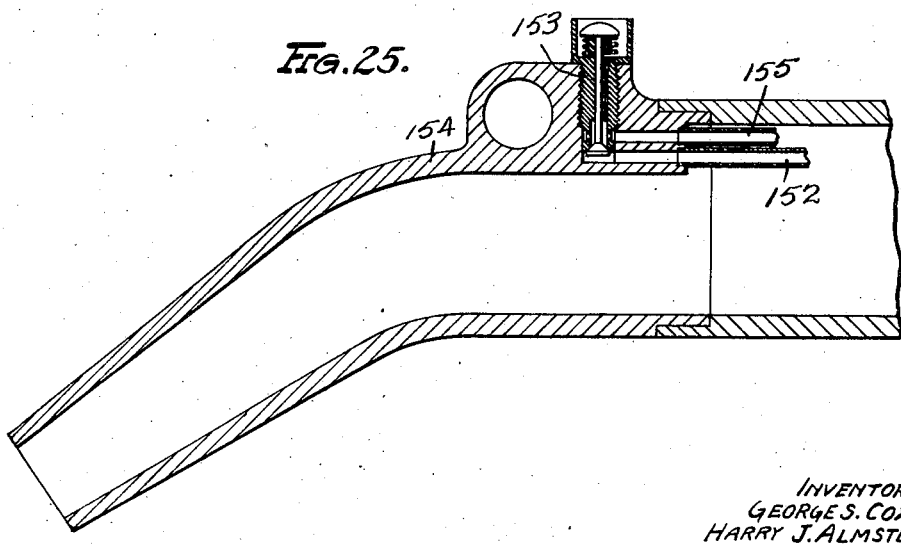
INVENTORS
GEORGE S. COX
HARRY J. ALMSTEDT
BY Edward E. Longan
ATTORNEY

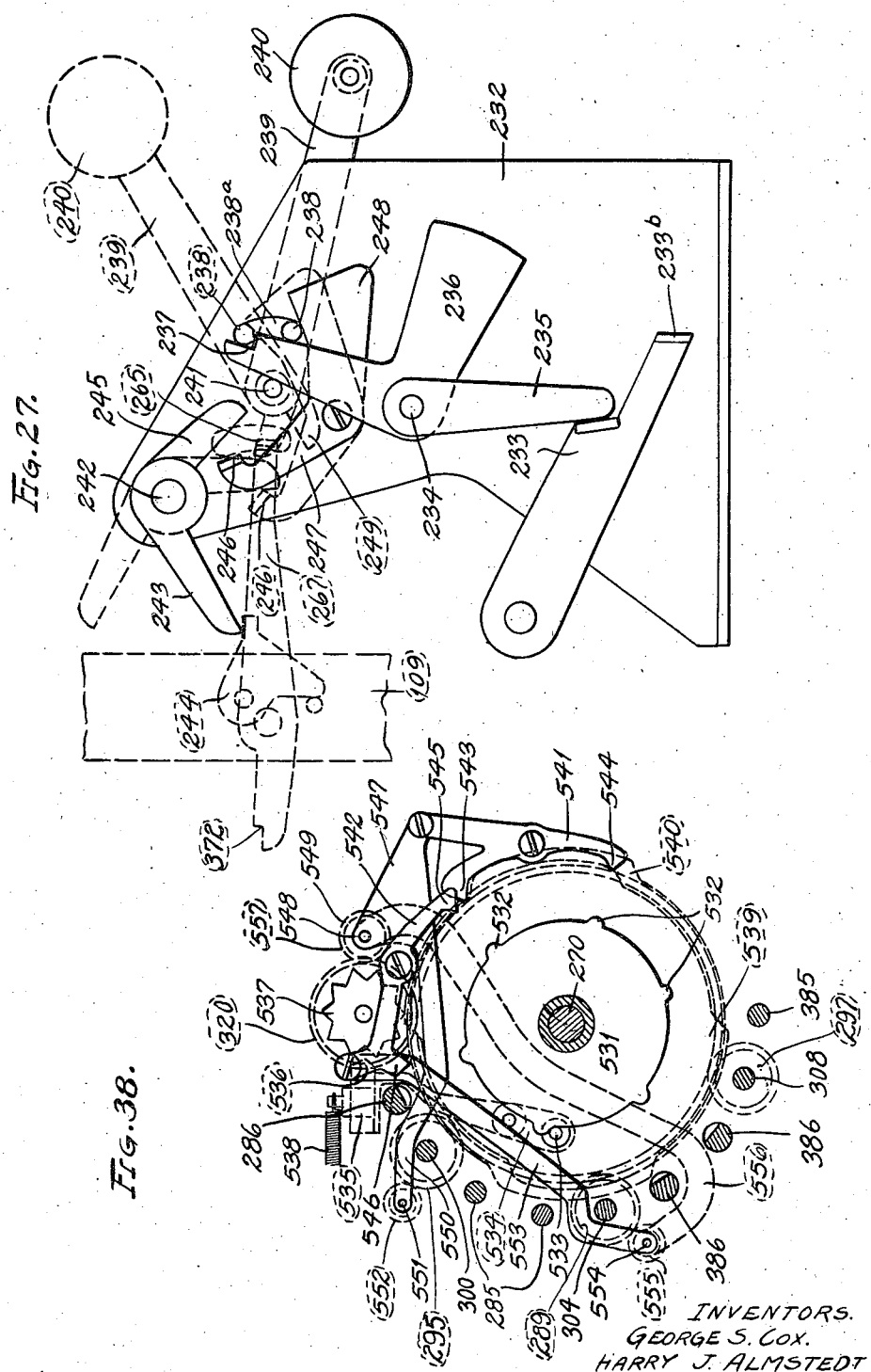

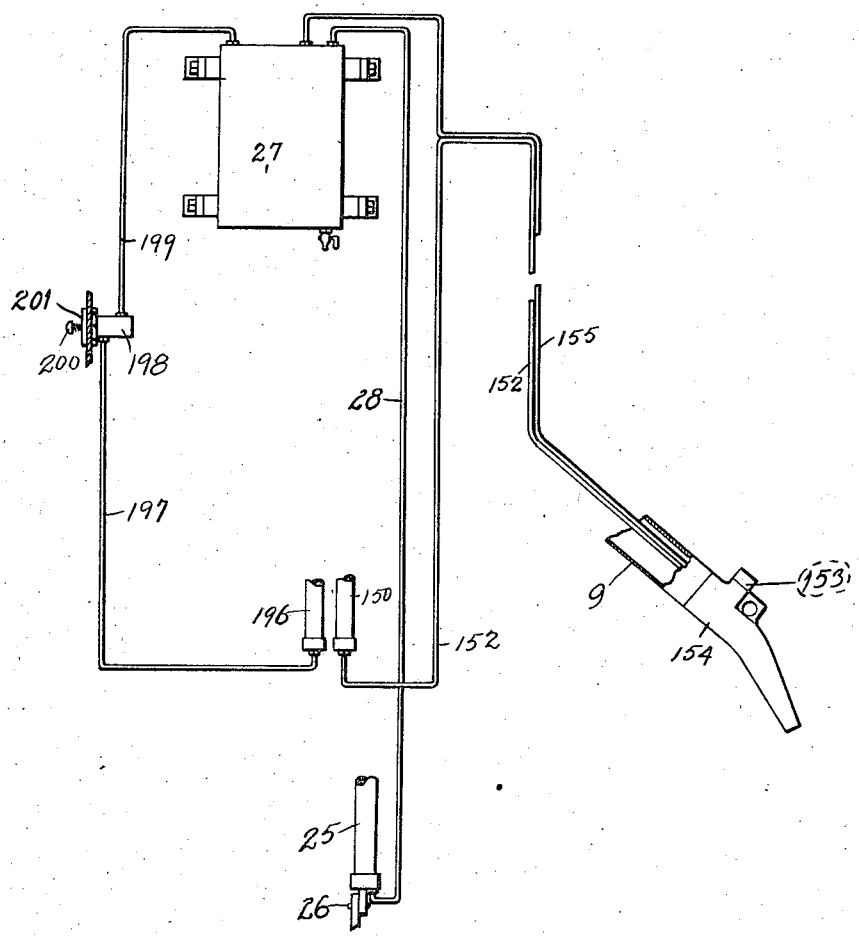

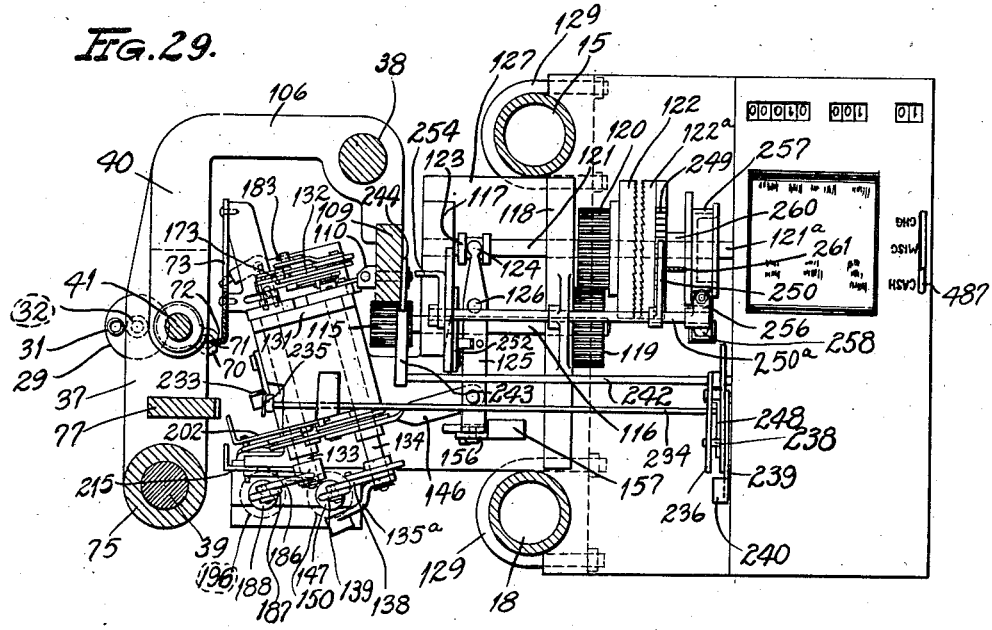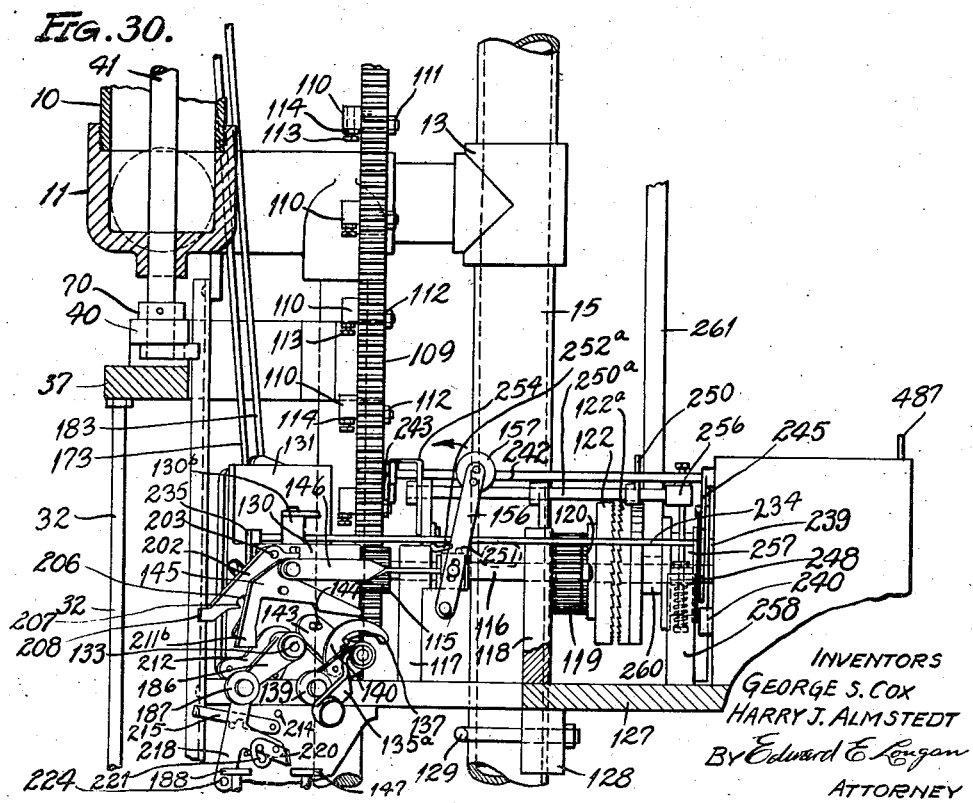

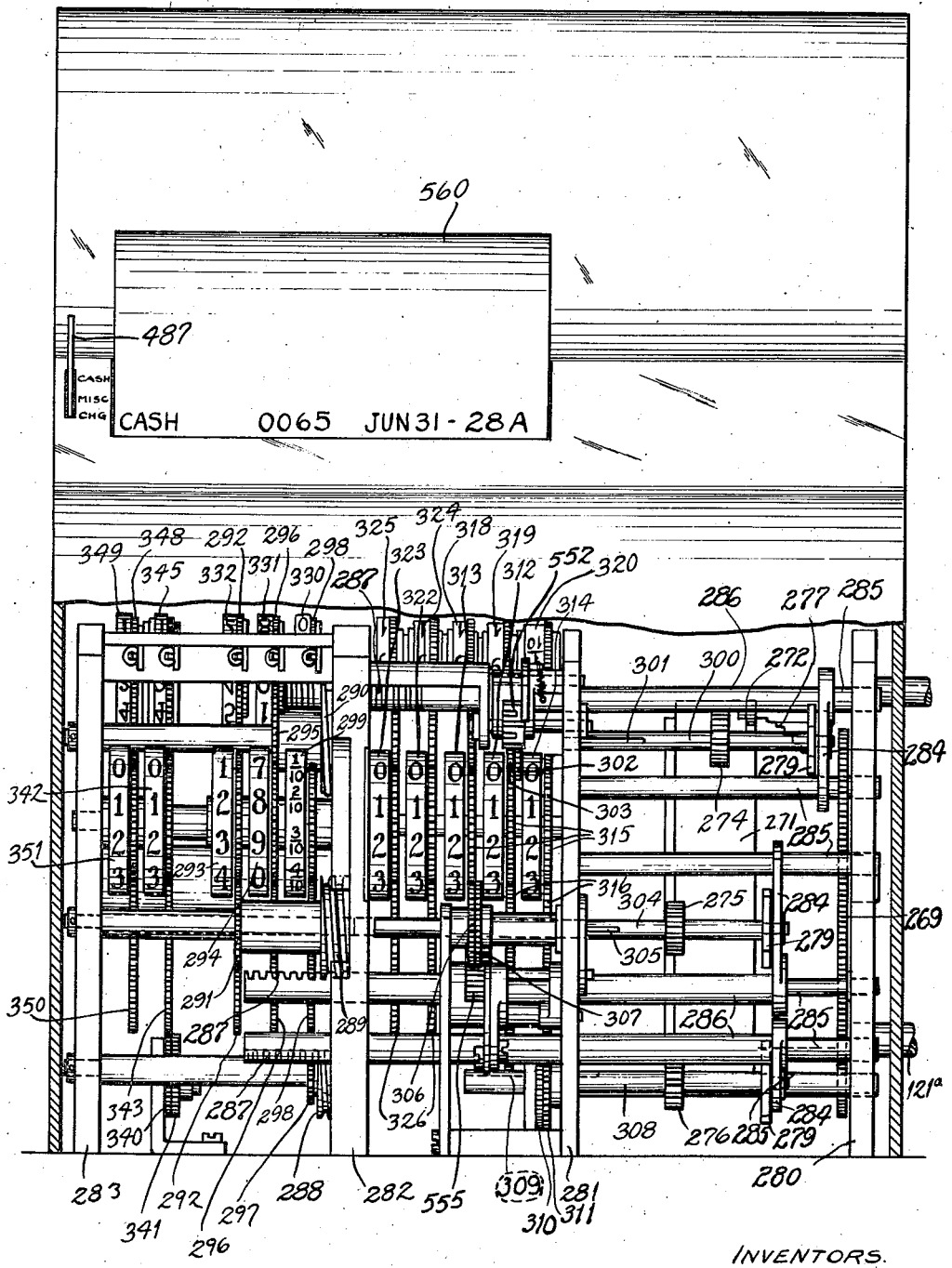

Aug. 26, 1930. G. S. COX ET AL 1,773,723
DISPENSING DEVICE
Filed Nov. 5, 1928 19 Sheets-Sheet 13

INVENTORS:
GEORGE S. COX.
HARRY J. ALMSTEDT.
By Edward E. Longan
ATTORNEY.

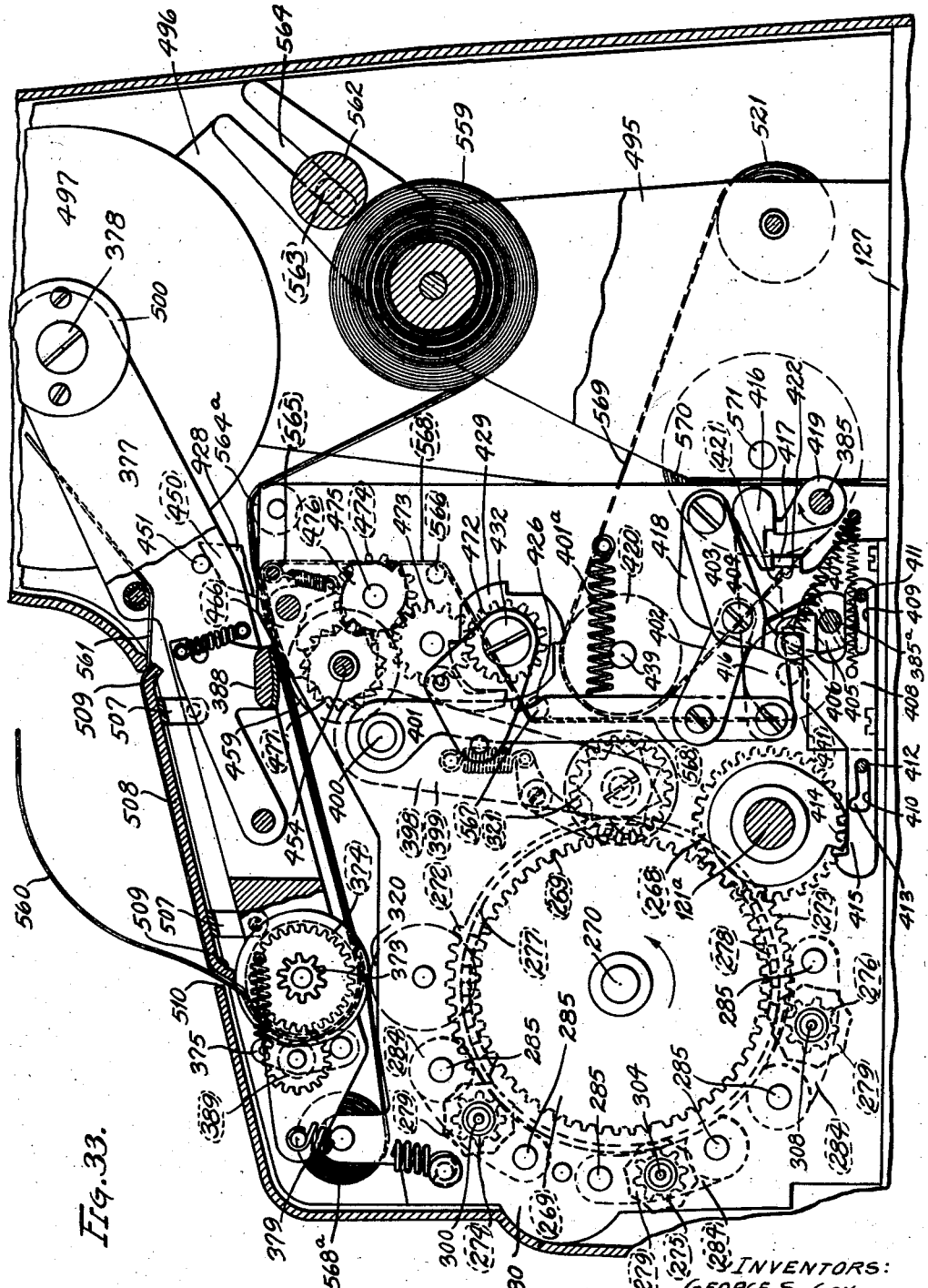

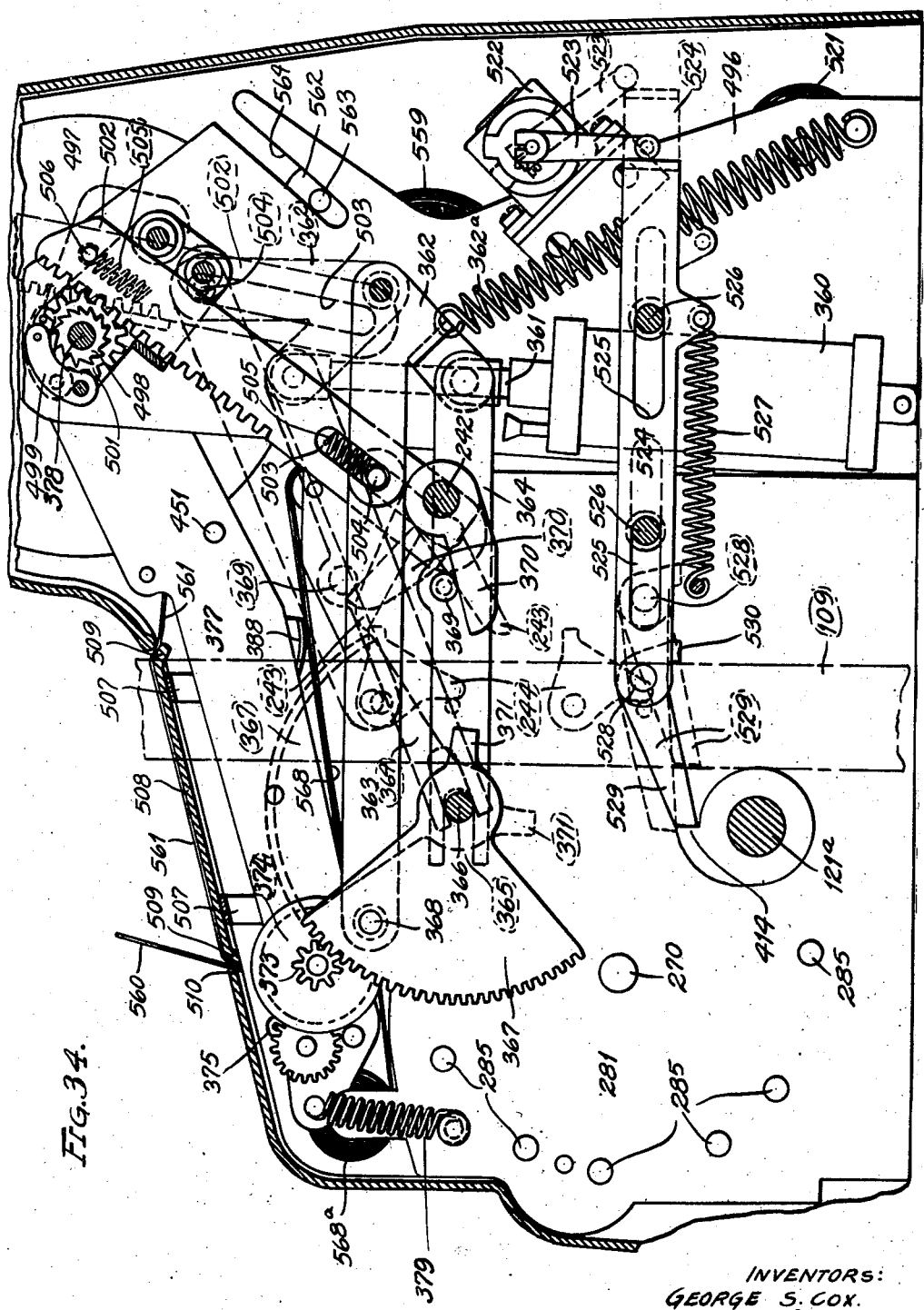

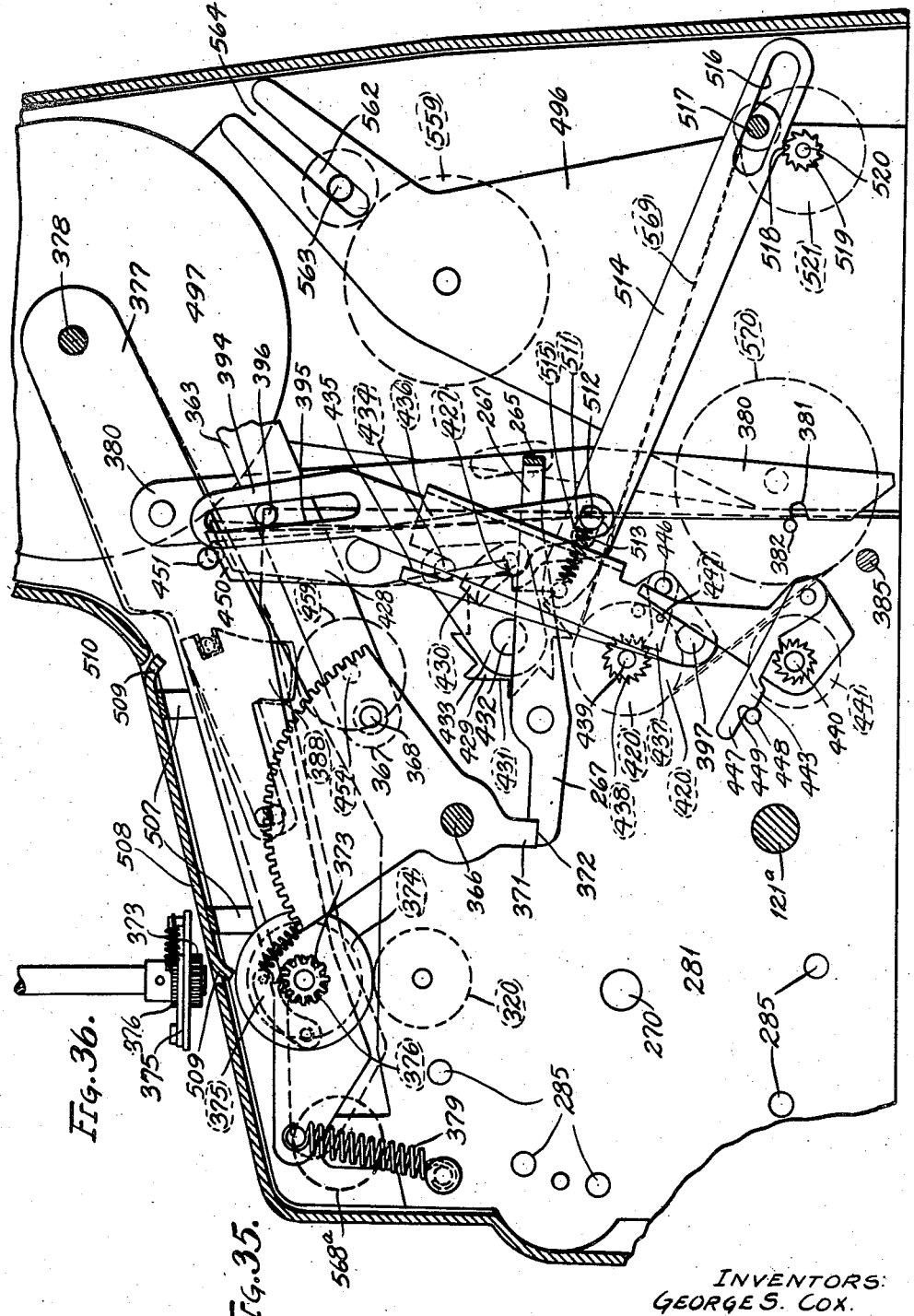

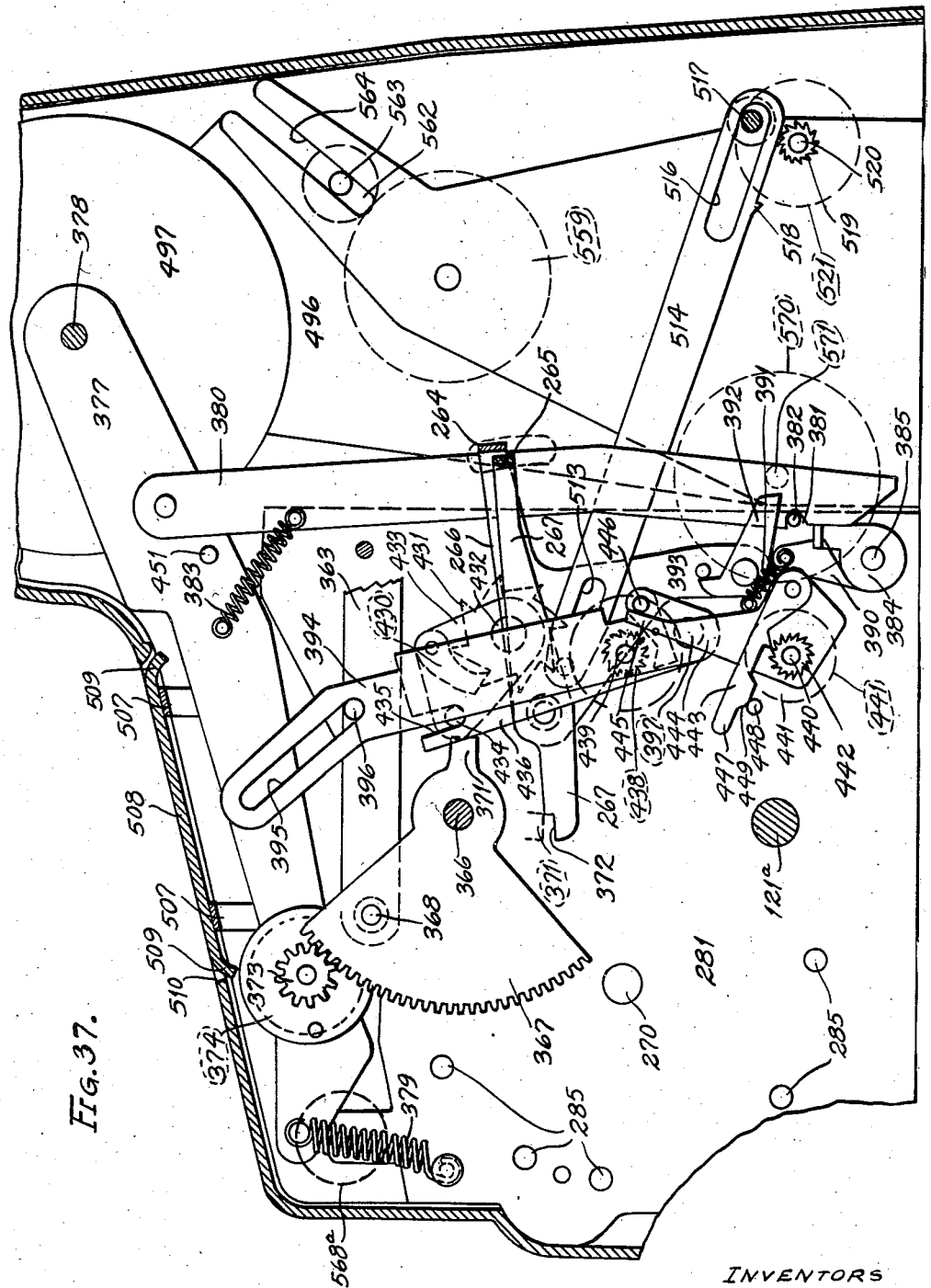

Aug. 26, 1930.                G. S. COX ET AL                1,773,723
                              DISPENSING DEVICE
                           Filed Nov. 5, 1928          19 Sheets-Sheet 18
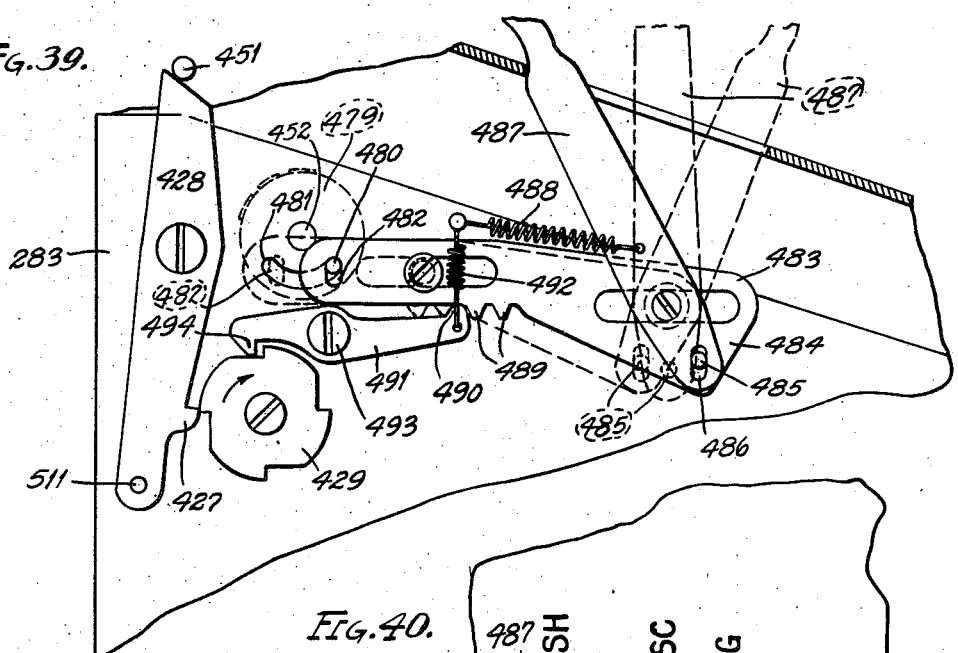
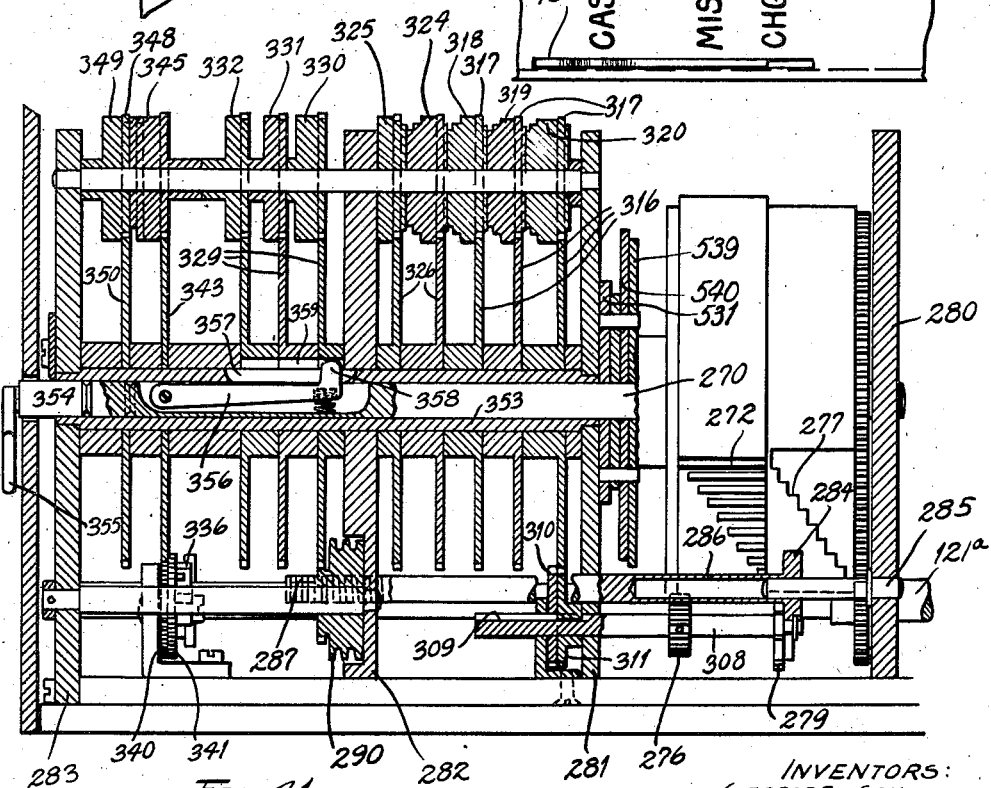
INVENTORS:
GEORGES. COX.
HARRY J. ALMSTEDT.
By Edward E. Longan
ATTORNEY.

Aug. 26, 1930.   G. S. COX ET AL   1,773,723
DISPENSING DEVICE
Filed Nov. 5, 1928   19 Sheets-Sheet 19
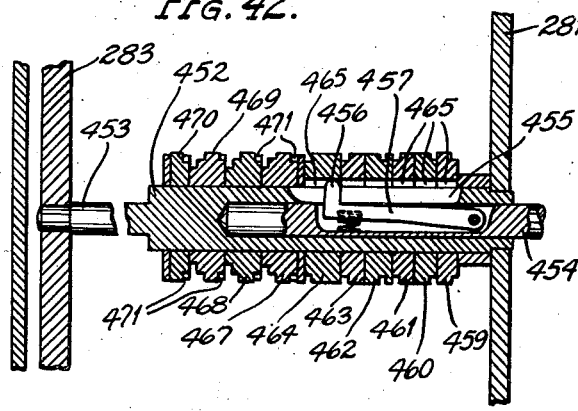
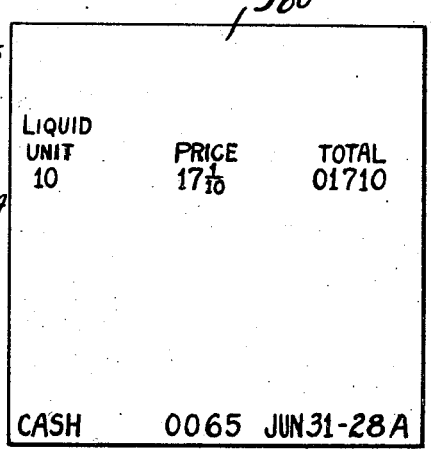
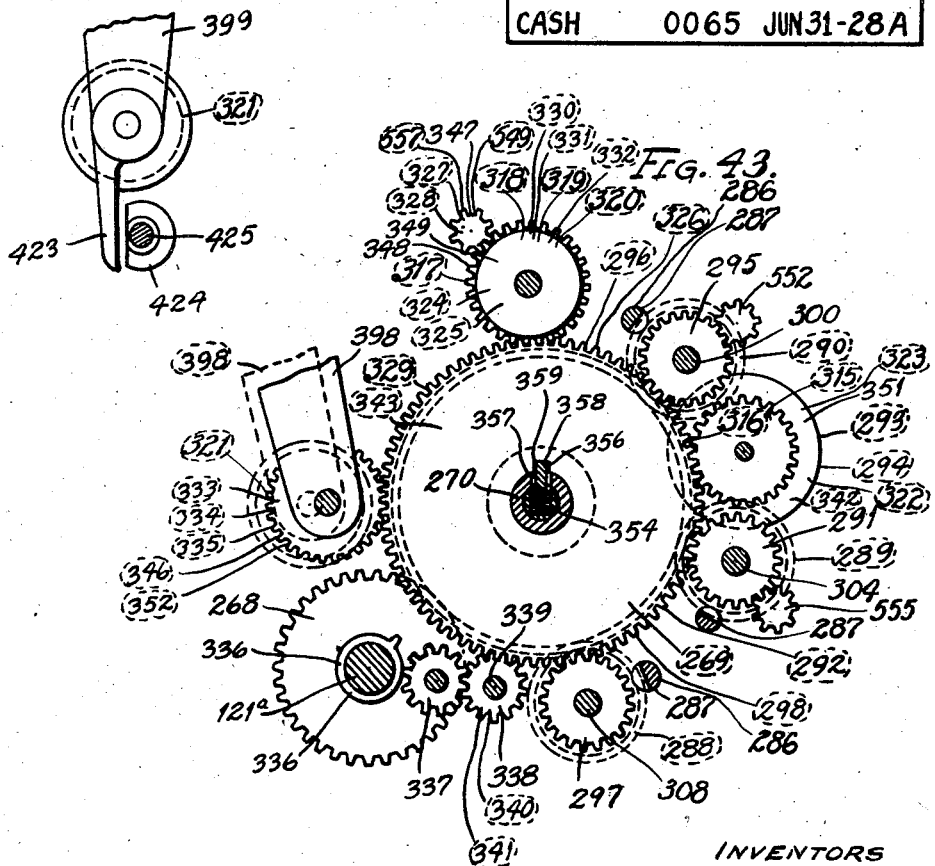
INVENTORS
GEORGE S. COX
HARRY J. ALMSTEDT
BY Edward E. Longan
ATTORNEY.

Patented Aug. 26, 1930

1,773,723

UNITED STATES PATENT OFFICE

GEORGE S. COX AND HARRY J. ALMSTEDT, OF ST. LOUIS, MISSOURI, ASSIGNORS TO ARGYLE PRODUCTION COMPANY, OF ST. LOUIS, MISSOURI, A CORPORATION OF DELAWARE

DISPENSING DEVICE

Application filed November 5, 1928. Serial No. 317,166.

Our invention relates to improvements in dispensing devices, and has for its primary object a dispensing device such as is used at gasoline filling stations and which is so arranged that the number of gallons of fluid pumped from a storage tank will be visible in a transparent bowl, both the liquid level and figures showing the number of gallons in the bowl being plainly visible to the purchaser, and in which the figures set up automatically drop as the liquid is being dispensed.

A further object is to construct a dispensing device which is so interconnected with a progressive price accumulating mechanism that upon the commencement of withdrawal of liquid from the visible container the computing mechanism will be operated automatically by a dual control of the dispensing mechanism and thereby requiring no manipulation on the part of the dispenser.

A further object is to construct a dispensing device which is provided with an automatically operated progressive price accumulator, which accumulator will print and deliver a ticket upon the pushing of a button or operation of a lever. The operation of printing the ticket automatically placing the dispensing device in such a position that the residue of fluid left in the visible container will be automatically released and flow back into the storage tank.

A still further object is to construct a dispensing device for fluids which is so arranged that a predetermined number of gallons or unit quantities can be pumped into a visible container, the mechanism controlling the amount of quantity units delivered into the visible container being so arranged that before another set-up for a predetermined quantity of liquid can be made, the entire visible container must be drained. This precludes an operator from dispensing a limited quantity of fluid and then afterward dispensing more liquid from the same quantity that was originally in the container. This is accomplished, as aforesaid, by the dual control mechanism automatically returning the residue of fluid remaining in the container after a sale to the storage tank by the printing of a ticket.

A still further object is to construct a dispensing device which is provided with an automatic progressive accumulating mechanism, the accumulating mechanism being normally in inoperative position and which will be automatically placed in operative position as soon as the dispensing of liquid occurs, the accumulating mechanism being operated solely by the dispensing apparatus and being so constructed that it cannot be manually operated.

A further object is to construct a dispensing device which is provided with an automatically operated progressive accumulating device in which the accumulating device is automatically disconnected by the dual control mechanism from the dispensing device by the operation of printing a sales ticket, this printing of the sales ticket also automatically locking the dispensing valve and simultaneously opening a residue valve, which causes the measuring container of the dispensing device to automatically drain itself. In this manner after each dispensing operation, it will be necessary to re-set the device for a predetermined number of gallons before any further operation can take place.

A still further object is to construct a dispensing mechanism provided with an automatic progressive accumulating mechanism, which is so arranged that a sales ticket bearing a serial number and a date can be issued without the dispensing of any fluid from the dispensing device but when the device is so operated no accumulating will take place.

A still further object is to construct a dispensing device in which, after a predetermined amount or number of quantity units have been dispensed, a ticket will be issued on which the total number of quantity units dispensed is indicated, the price per quantity unit, the total selling price of the quantity units dispensed, the date on which the sale was made, and a ticket number.

A still further object is to construct a dispensing device which is provided with an automatically operated and controlled progressive accumulating mechanism in which is printed a customer's sales ticket, a daily record strip and a permanent record strip.

A still further object is to construct a dispensing device having a progressive accumulating mechanism interconnected therewith and automatically operated thereby during the dispensing operation and which will deliver a printed ticket after the desired amount of fluid has been dispensed in which the accumulating mechanism is so arranged that simultaneously with the printing of the ticket the accumulating mechanism will be disengaged, leaving the register wheels of the computer mechanism set up so that they can be compared with the ticket just issued.

Fig. 1 is a vertical section of the upper portion of our device looking at the front.

Fig. 2 is a similar section looking at the side.

Fig. 3 is a vertical section of the lower portion of the base looking from the front showing the position of the pumps and various piping connections.

Fig. 4 is a similar view of the base in section looking at the same from the side.

Fig. 5 is an enlarged fragmental view with parts in section showing the various control levers of the dual control mechanism employed in the dispensing.

Fig. 5A is a view of the plate employed for preventing movement of the dispensing operating mechanism piston before a set-up has been made.

Fig. 6 is a top plan view of the air pistons employed in operating the control mechanism showing parts of the mechanism in section.

Fig. 7 is a fragmental elevation with parts in section of the dispensing valve control mechanism.

Fig. 8 is a side view of the dual control lever mechanism employed in releasing the dispensing tube.

Fig. 9 is a side view of a lever mechanism employed for controlling the dispensing and residue valves.

Fig. 10 is an end view of the same.

Fig. 11 is a fragmental view of the quantity indicating mechanism used within the bowl showing the manner of setting up the numerals before filling the bowl.

Fig. 12 is a fragmental view of the same showing the manner in which the figures are automatically lowered as the fluid is dispensed.

Fig. 13 is a view showing the position of the various parts when the bowl is drained and ready for clearing the indicating numbers.

Fig. 14 is an edge view of the lower part of the indicating scale illustrated in Fig. 11.

Fig. 18 is a vertical section with parts broken away of the control valve used in connection with the dispensing mechanism.

Fig. 19 is a horizontal section taken on the line 19—19 of Fig. 18.

Fig. 20 is a front elevation of the handle and dial employed in making the quantity unit set-up in the bowl.

Fig. 21 is a vertical central section of the same.

Fig. 22 is a side elevation with parts broken away of the rear of the set-up mechanism.

Fig. 23 is a rear view of the spring-controlled disk made use of in the set-up device.

Fig. 24 is a fragmental sectional view of the stop made use of in the set-up device.

Fig. 25 is an enlarged view of the filling nozzle employed showing the dispensing air control valve located therein.

Fig. 26 is an enlarged fragmental view of the air valve employed in releasing the residue and printing the ticket.

Fig. 27 is an enlarged view of the lever mechanism employed for controlling the printing and ticket issuing mechanism.

Fig. 28 is a diagrammatic view of the air reservoir and the various piping connections and control valves employed.

Fig. 29 is a horizontal section of the dispensing operating mechanism and a top plan view of the computer in attached position showing the dual control levers and the operating mechanism connecting the two.

Fig. 30 is a side elevation of the same.

Fig. 31 is an enlarged front elevation of the computing mechanism and its casing with part of the casing broken away.

Fig. 33 is an enlarged section showing the position of the various rolls of paper and illustrating the printing mechanism.

Fig. 34 is a section taken on the line 34 of Fig. 32 looking in the direction of the arrow.

Fig. 35 is a section taken on the line 35—35 of Fig. 32.

Fig. 36 is a top plan view of the feed roll mechanism.

Fig. 37 is a section same as 35 taken in the resting position.

Fig. 38 is a diagrammatic end view with parts in section of the control mechanism employed for the computing drums.

Fig. 39 is a fragmental side view with parts in section of the mechanism employed for indicating the character of the sale.

Fig. 40 is a fragmental top plan view of the computer housing showing the position of the handle which controls the character of sale mechanism.

Fig. 41 is an enlarged vertical section showing the mechanism employed for changing the unit quantity price mechanism.

Fig. 42 is an enlarged vertical section of the dating mechanism showing the pawl employed for changing the same.

Fig. 43 is a diagrammatic view with parts in section showing the gear train of the computer and totalizer.

Fig. 46 is a face view of the ticket as printed.

Fig. 47 is a fragmental view showing the cam for moving the totalizer while setting the unit sales price.

Figure 4A:
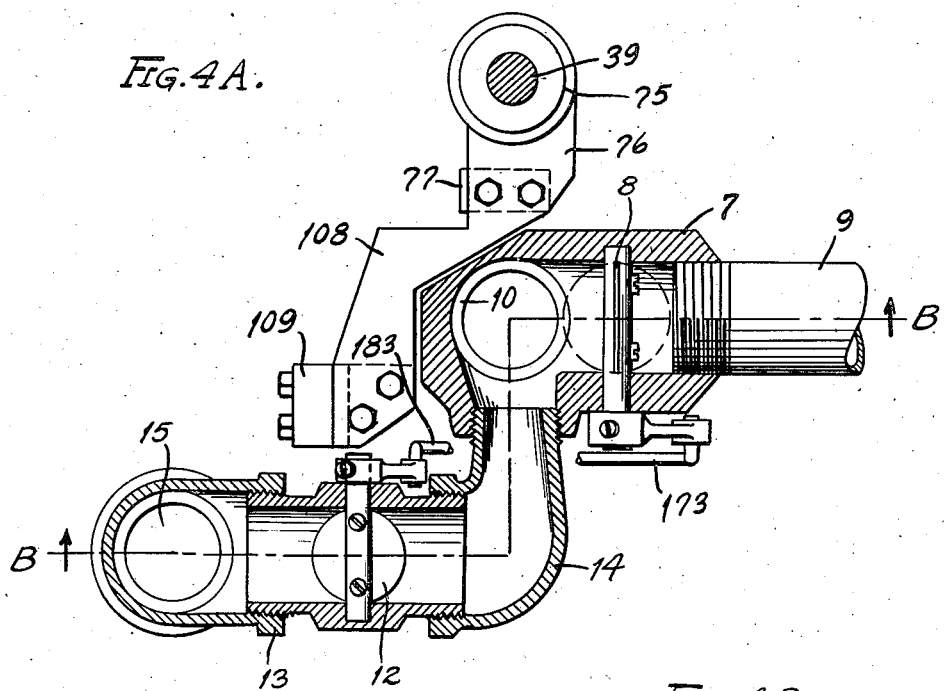
Fig. 4A is an enlarged horizontal section taken through the residue and dispensing valves showing the location of the same.
Figure 4B:
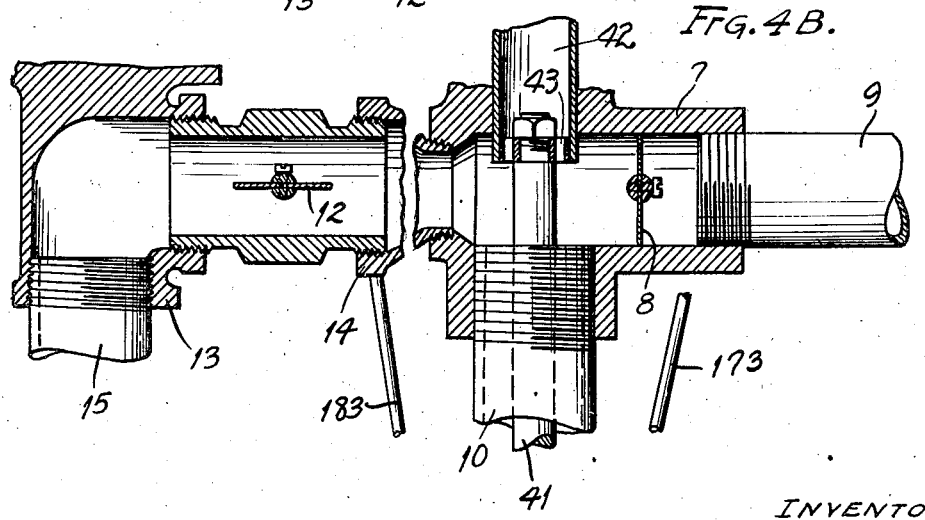
Fig. 4B is a section taken on the line B—B of Fig. 4A.

In the construction of our device we employ a base flange 1 on which is supported a column 2. On the top of the column 2 is mounted a second flange 3 on which is mounted a transparent bowl 4, the base 3 forming the bottom of the bowl. The bowl 4 is closed by means of a cap 5, which is held in position by means or rods 6 secured thereto and passing through the flange 3. Formed on the underside of the flange 3 is a housing 7. This housing is provided with an outlet butterfly valve 8 and to the forward part of the housing is attached the dispensing hose 9. To the rear of the valve 8 and formed in the bottom of the housing 7 in a screw threaded opening which receives a pipe 10. This pipe 10 has in turn a fitting 11 secured to its lower end for closing the pipe. The housing is also provided with an L 14, which carries a fitting containing a residue release butterfly valve 12 (Fig. 4A). The fitting, which contains the residue release butterfly valve, is in turn connected to a pipe L 13, which L is carried by a pipe 15, this pipe leading down to the storage reservoir not shown, and it is by means of this last mentioned valve that the various pipe connections before described permit the draining of the dispensing bowl back into the storage tank.

Carried by the flange 1 and located within the column 2 is a liquid pump 16. This pump has a pipe 17 leading from it to the underground storage tank. Carried by the pump 16 is a liquid supply pipe 18, which extends upward through the flange 3 and into the bowl 4, the upper end of this pipe terminating near the cap 5. The pump 16 is operated by means of a handle 19, which is connected to a shaft 20. This shaft in turn has secured thereto an arm 21 to which one end of a link 22 is secured. The opposite end of this link is secured to the pump rod 23.

In this manner, when the handle 20 is moved from side to side, the arm 21 will be rocked up and down and thus impart a reciprocating movement to the pump piston drawing up fuel from the storage tank and discharging it into the visible container through the pipe 18.

Secured to the outer end of the arm 21 is a piston rod 24, which rod is connected to a piston mounted in an air pump 25. This air pump is pivotally carried, at the point indicated by the numeral 26, by the base and is designed to supply air under pressure to the storage tank 27 mounted in the column 2 through the pipe 28. The purpose of this compressed air will be explained in detail later.

Carried by the flange 1 is a control 29. This control is designed to be filled with a fluid and is provided on its upper end with a head 30. This head is provided with a vent 31, which is preferably in the form of a tube as illustrated in Fig. 18. Passing through the head 30 is a piston rod 32, which has its lower end connected to a piston 33. The piston 33 is provided with a calibrated vent 34 and with a ball check valve 35. Surrounding the piston rod 32 and resting on top of the piston 33 is a deflector 36. The purpose of this deflector is to prevent fluid from being splashed out through the vent 31 as the piston 33 descends, it being understood, of course, that the cylinder or casing 29 is filled almost to the top with fluid. The purpose of the ball check valve or passage 35 is to permit the piston 33 to be raised rapidly but its downward movement is controlled by the fluid below the piston 33 being permitted to pass only through the calibrated opening 34 as the piston descends, the ball check in the passage 35 closing when the piston descends. In this way we can control the speed at which the piston 33 descends, and it is during this time that the deflector 36 comes into action.

The fluid, as it passes through the calibrated passage 34 striking the inclined face of the deflector 36, is directed toward the wall of the cylinder 29 instead of up against the head 30.

It will be noted from Fig. 19 that there are quite a number of ball check passages 35, this being necessary in order that the piston 33 may be raised freely while its downward movement, as aforesaid, is controlled by the calibrated passages 34 which are fewer in number than the passages 35.

Secured to the upper end of the piston rod 32 is a yoke 37. This yoke is slidably carried by rods 38 and 39. Slidably carried by the rod 38 is an arm 40, which is raised and lowered simultaneously with the yoke 37. This arm 40 carries a rod 41, which projects upward through the pipe 10 and has secured to its upper end the dispensing tube 42. This dispensing tube is provided at its bottom with passages 43 by means of which liquid entering the dispensing tube top will pass down inside of the tube 42 and into the pipe 10. The precise method of this operation will be explained in detail later.

Figure 15:
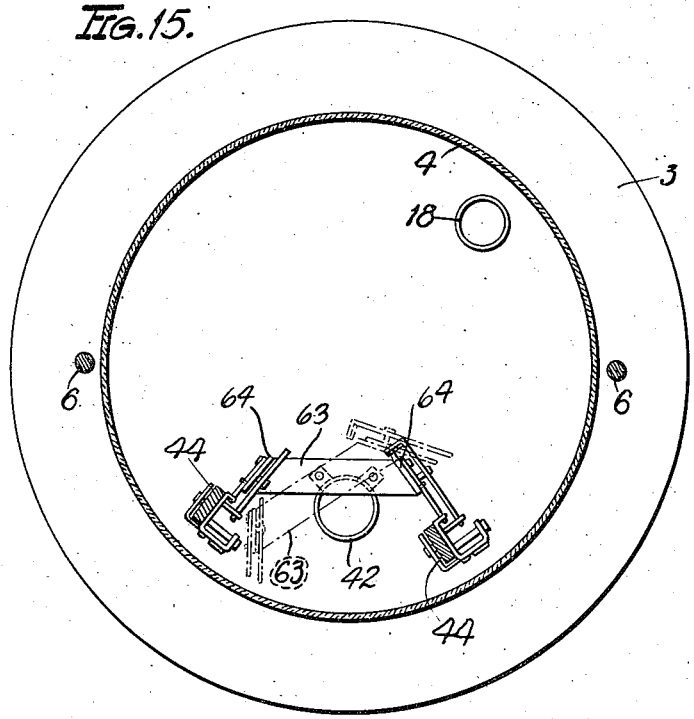
Fig. 15 is an enlarged horizontal section taken through the bowl showing the manner of swinging the number tripping mechanism out of operative position in doted lines.
Figure 45:
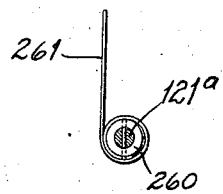
Fig. 45 is a section showing the manner of securing the tape of the clearing mechanism to the shaft which it operates.

Extending upward in the bowl are standards 44, which are located adjacent the dispensing tube 42 and on each side thereof (Fig. 15). Pivotally secured to the face of the standards nearest the dispensing tube are trip levers 45, which have arms 47 and 48 (Figs. 1 and 11). These arms extend rearwardly from the pivot point toward the center of the bowl. Carried by the trip levers 45 are brackets 49, which carry digits or other unit quantity indicating symbols 50. The trip levers are adapted to swing about their pivot 51, which are carried by the standards 44, so that the indicating symbols may be in either vertical or visible position, or in horizontal or invisible position.

The movement of the trip levers in one direction is limited by pins or stops 52 carried by the standards 44 and in the other direction by pins or stops 52A. The stops 52 are adapted to contact with the arms 47 of the trip levers 45 when the indicating symbols are in vertical or visible position and the stops 52A with the arms 47 when the symbols are in horizontal or lowered position. The arms 48 are shorter than the arms 47. The arms 47 are for the purpose of setting up the symbols in the measuring bowl and the arms 48 for lowering the symbols as the contents of the bowl are dispensed. This operation will be explained in detail later.

Carried by the standards 44 and on the face opposite that to which the trip levers are pivoted are bars 54. These bars are provided with slots 55 through which rivets or rods extend. These rods hold the bars 54 from lateral movement but permit the bars to be raised and lowered. The bars 54 are provided with fingers 56, there being one finger for each indicating symbol.

Pivotally secured to the bars 54 are swinging levers 57, their movement being limited by pins 58 and 59 so that the lower end of the swinging lever has a limited swinging movement. The lower end of the swinging lever is adapted to contact with a cam 60, which is mounted on a shaft 61. This shaft passes through the lower slot 55 in the bar 54 and through the standards 44. This shaft has rigidly secured thereto a lever 62 which, when raised, will swing the cam 60 upward lifting the bars 54. This in turn causes an upward movement of the fingers 56, which will contact with any of the indicating symbols still left standing after a quantity of liquid has been dispensed for the purpose of lowering all of the symbols prior to a new setting-up action and due to the swinging movement of the lever 57 it can move aside and permit the cam 60 to pass after the cam has reached the bar 54.

Secured to the upper end of the dispensing tube 42 is a cross arm 63 which has its ends upturned as at 64. Pivotally secured to the upturned ends 64 are levers 65. These levers are pivotally secured at their ends as indicated by the numeral 66. The downward movement of the free end of the lever 65 is limited by means of a pin 67. The purpose of this is that as the dispensing tube and cross arm 63 is raised, the end of the lever 65 will contact with the arm 47 and place the indicating symbols in upright position as indicated in Fig. 11 but on the downward movement this arm can swing upwardly or, in other words, idle as it descends.

Pivotally secured to the upturned ends 64 is a second lever 68. This lever is pivoted intermediate its ends as indicated by the numeral 69. The lever 68 is so arranged that on the upward movement its one end can be readily depressed so that it will idle on the up stroke or raising of the dispensing tube 42 and cross arm 63 but on the descent, the opposite end of the lever 68 will be lowered and come to rest on the cross arm 63. This will cause it to contact with the arm 48 of the trip lever 45 and lower the symbol. This is clearly indicated in Fig. 12. In this way one lever operates to set up the symbol and the other to lower the symbol.

Figure 16:
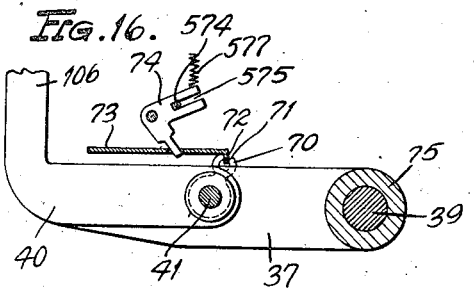
Fig. 16 is an enlarged fragmental view with parts in section showing the mechanism used for swinging the number tripping mechanism out of operative position.

The rod 41, which controls the raising and lowering of the dispensing tube 42, has attached thereto an arm 70. This arm is rigidly attached and is provided with a bifurcation 71 in which the inturned edge 72 of a plate 73 extends. The plate 73 is mounted for lateral movement (see Figs. 1 and 16) and is designed to be moved backward and forward by a bell crank lever 74. When this movement occurs, the rod 41 is turned, turning also the dispensing tube and the cross arm thus swinging the levers carried by the upturned ends of the cross arm into such a position that they will not contact with either the arms 47 or 48. The purpose of this will be explained in detail later.

The yoke 37 is provided with a sleeve 75 which surrounds the rod 39. The upper end of this sleeve is provided with an arm 76 and between the arm 76 and the yoke 37 is secured a rack 77. This rack meshes with a gear 78 rotatably carried by the sleeve 79, the sleeve 79 being carried by the column 2. The sleeve 79 is provided with a flange 80 which is located on the outside of the column 2 and is secured by means of a nut 81. This nut is preferably arranged for use with a spanner wrench. Secured to the flange 80 is an indicating plate 82 which is provided in its outer face with a plurality of depressions 83 (Figs. 20 and 21). These depressions are spaced apart and bear symbols corresponding, both in kind and number to those carried by the standards 44.

In the periphery of the disk 82 are formed a plurality of depressions 84 corresponding in number to the depressions 83. These depressions are adapted to receive one end of a spring actuated pawl 85, which is carried by an arm 86. This arm in turn being rotatably mounted on a plate 87, which is concentric with the disk 82. This plate in turn is rotatably mounted on a boss or projection 88 carried by the disk 82.

Carried by the plate 87 is a bifurcated lug 89 in which is pivotally secured one end of the handle 90.

The handle 90 is also provided with a slot 91 in which is pivotally secured the end 92 of the shaft 93. This shaft extends concentrically through the sleeve 79 and has secured on its end a spring-actuated disk 94. Interposed between the disk 94 and the gear 78 is a coil spring 95. This coil spring has a tendency to force the disk 94 away from the gear.

Extending through the disk 94 is a sliding pin 96 which has its end beveled as indicated by the numeral 97. This pin is adapted to contact with a pin 98 projecting from one face of the gear 78 so that when the disk is turned in one direction, the pin will turn the gear but when turned in the other direction, the pin will ride past the gear and the gear remains stationary. The pin 96 is controlled by a leaf spring 99 which is secured at one end to the disk 94 as indicated by the numeral 100. This mechanism just described constitutes the setting-up mechanism. In other words, it is by this means that the dispensing tube is raised to the proper height in the bowl 4.

The handle 90 is provided with a pin 101, which is adapted to enter the depressions 83 thus fixing the distance to which the dispensing tube 44 is raised and also with a pin 102, which pin is adaped to contact with a projection 103 formed on the periphery of the disk 82. This limits the rotation of the handle. In other words, the handle cannot be rotated farther than the last depression in the disk 82.

In rotating the handle it is, of course, necessary to pull outward thereon to remove the pin from the zero opening in the disk 82. This compresses the spring 95 and draws the spring-actuated disk 94 toward the gear 78 causing a considerable overlapping of the pins 96 and 98 and then by rotating the handle while it is in outward tilted position, the contact of the two pins 96 and 98 causes the gear 78 to rotate. This rotation can be continued until the pin 101 strikes the arm 86, which limits its movement. The handle is then released causing the pin 101 to enter a depression 83 in the disk, which entrance is controlled by the position of the arm 86 and thereby the vertical lifting or adjustment of the dispensing tube 44 in the bowl 4 is controlled.

The adjustment of the arm 86 is obtained by pulling up on the knob 104, which forms part of the pawl thereby compressing the spring 105 so that the pawl 85 can be raised out of the depressions 84 after which the arm can move around to the desired point.

The arm 40 is provided with an L shaped extension 106 (Figs. 1 and 29) through which the guide rod 38 extends. The arm 76 is likewise provided with an L shaped extension 108 and carried by these extensions is a second rack 109. This rack is provided on one face with a plurality of lugs 110. These lugs have screw threaded shanks 111 which pass through the rack and are secured in position by means of nuts 112 (Fig. 30).

The lugs 110 are provided with screw threaded bores in which stops 113 are adjustably secured. The purpose of making these stops adjustable is to permit compensating for any variation in the inside diameter of the bowl which, usually being formed of glass, is apt to vary slightly in inside diameter so that equal spacing of the lugs and stops would not give an equal quantity unit during the dispensing.

Accidental shifting of these stops (Fig. 8) is prevented by means of lock nuts 114.

The rack 109 in turn meshes with a gear 115, which gear is mounted on one end of a shaft 116, the shaft being mounted in bearings 117 and 118. To the opposite end of the shaft 116 is attached a gear 119, which in turn meshes with a gear 120 carried by the shaft 121, which shaft is rotatably and slidably mounted in the bearings 117 and 118. The shaft 121 also carries on its end adjacent the gear 120 a clutch member 122, which is for the purpose of placing the accumulating computer in operation in a manner which will be described in detail later.

Mounted on the shaft 121 is a double flanged collar 123, which receives the fork 124 of a lever 125. This lever is pivoted at a point indicated by the numeral 126 to a plate 127. The plate 127 is supported by the pipes 15 and 18 by being secured to a cleat or cross member 128, which cleat or cross member is secured to the pipes by means of U bolts 129. This plate also extends outwardly and supports the computer.

Carried by the plate 127 are brackets 130 and 132 (Figs. 5, 8 and 29) through which extend shafts 133 and 134. The shaft 133 has secured to one end a cam 135 and the shaft 134 a cam 136. These cams, as will be noted, are in the form of a half circle and their operation will be explained in detail later. Secured to the opposite end of the shaft 134 is a weighted lever 135A. This lever is provided with a hub which carries a pin 137.

Loosely mounted on the shaft 134 is a lever 138 which has a roller 139 secured to its outer end. Pivotally carried by the lever 138 is a pawl 140, which has a tooth 141. This tooth is adapted to engage with the pin 137 so that as the arm or lever 138 is raised the shaft 134 will be rotated. This rotation continues until the point 142 of the pawl 140 contacts with the plate 127 and then on continued upward movement of the arm or lever 138 a tooth 141 will be released from the pin 137 thus releasing the shaft and permitting the counterweight 135 to bring the shaft back to its original position.

Mounted on the shaft 134 adjacent the arm 138 is an arm 143 which carries a pin 144. This pin is adapted to contact with the lever 145 which is pivotally mounted on the bracket 130. Pivotally secured to the lever 145 is a link 146. This link in turn is connected to the lever 125 and moves the same on its pivot for engaging and disengaging the clutch, which controls the operation of the computer (Figs. 29 and 30).

The roller 139 is adapted to be contacted with by the head 147 carried by the piston rod 148. This piston rod is in turn carried by a piston 149 mounted in an air cylinder 150. The piston 149 has a valve 151 located therein, a detailed construction of which will be explained later. Secured to the bottom of the air cylinder 150 is an air pipe 152, which air pipe communicates with an air valve 153 carried by the filling nozzle 154.

The air valve 153 has also attached thereto an air pipe 155 which leads to the air tank 27 and on the opening of the valve 153 air will pass from the tank 27 through the pipe 155 and then through the pipe 152 and be admitted to the bottom of the piston 149 thus raising the plate 147 and causing it to contact with the roller 139 and raise the same together with the arm 138 thus imparting rotation to the shaft 134.

When the link 146 is operated so as to throw the clutch member 122 in engagement with its opposing member, the pivoted arm 156 together with the weight 157 is pulled in the direction indicated by the arrow (Fig. 30) and is thrown over center thus holding the clutch members in engaged position until they are released as will be hereinafter described.

The rotation of the shaft 134 also causes a rotation of the cam 136, which cam moves a sliding bar 158 (Fig. 8). This sliding bar contacts with the end of a pivoted lever 159. This lever is pivotally carried by the bracket extension 131 and is provided with a shoulder 160 with which a tooth 161 carried by a pivoted lock lever 162 engages. This lever also carries a pivoted pawl or dog 163 which is adapted to engage with the stops carried by the rack 109. The end of this dog or pawl is bifurcated as indicated by the numeral 164 so as to provide engagement with a pin 165. This pin limits the amount of swinging movement, which can be imparted to the pawl or dog 163.

Carried by the shaft 134 is a pawl 166, which has a projecting finger 167. This finger is adapted to contact with a lever 168 (Fig. 7) which is pivoted at 169 to the plate or bracket 132. To the opposite end of the lever 168 is attached a link 170, the opposite end of which link is pivotally attached to a lever 171, which lever in turn is pivoted at one end as at 172 to the bracket 132 and to the opposite end of the lever 171 is attached a rod 173, which leads to the serving valve and controls its operation.

The lever 168 also carries a pin 174 which, when the lever is raised, moves up and enters the recess 175 formed in one edge of the bracket 132 and when this occurs the lever 176 drops downward so that the tooth 177 formed thereon still engages with the pin and holds the lever 168 in raised position thereby holding the serving valve open until it is closed in a manner hereinafter to be described in detail.

The lever mechanism just described is mounted on the inside face of the bracket 132 and adjacent the levers carried by the bracket extension 131. On the opposite face of the bracket 132 is pivotally mounted a lever 178, the opposite end of which lever is provided with a tooth or projection 179, which fits into a recess 180 formed adjacent the end of the lever 181. This lever is also pivoted on the outer face of the bracket 132. Pivotally carried by the bracket 132 is a lever 182$^a$, which is connected to the lever 178 by a link 182 and to the free end of the lever 182$^a$ is attached a rod 183. This rod leads to the residue valve and controls its action.

Pivotally carried by the bracket 132 is a cam pawl 184, which is adapted to be contacted with by the flat portion 185 formed on the cam 135. This pawl 184 is actuated at the time a sales ticket is printed and places the residue valve mechanism in such position that the valve will be held open. However on a new set-up being made in the dispensing bowl, the cam pawl 184 moves in the direction of the arrow thus freeing it from contact with the lever 178.

Secured to the opposite end of the shaft 133 is an arm 186, which is provided on its free end with a roller 187. This roller is adapted to be contacted with by the plate 188 carried by the piston rod 189, which rod is attached to the piston 190. This piston, as well as the piston 149, is hollow and has extending therethrough a spool valve 191, the lower portion of which is adapted to seat itself in the valve seat 192. The upper portion of the valve 191 is provided with a flange 193 which limits its downward movement and permits the valve to sink a trifle so that air below the piston can pass through the opening therein and out through the passageways 194 formed in the upper face of the piston 190 and thence out through the opening 195 formed in the head of the air cylinder 196. The air cylinder 150 and piston 149 are constructed in identically the same manner as has been just described.

Secured to the lower end of the air cylinder 196 is an air pipe 197 which leads to the valve 198. This valve has attached thereto a second pipe 199, which leads to the air tank 27 so that upon pressing the button or head 200 the valve 201 is unseated permitting air to pass into the air cylinder 196 and operate or raise the piston 190.

Mounted on the bracket 130 is a lever 202 (Fig. 5). This lever is pivoted at the point indicated by the numeral 203 and has an extension 204, which is designed to contact with a pin 205. This pin projects from the bracket 130 and limits the movement of the lever 202 in one direction. The lever 202 is recessed as at 206 so as to provide a tooth 207. From thence this lever projects forwardly and is provided with a right angular bent portion 208 at its extreme end, which is adapted to be contacted with by a pivot dog 209, carried by the rack 77. This dog is free to swing in one direction but its movement in the opposite direction is limited by means of a pin 210 carried by the rack.

The tooth 207 is designed to receive the pin 211 carried by a lever 212. This lever is secured to the shaft 133 and when the pin 211 is engaged with the tooth 207, the residue valve is retained in open position so that any liquid flowing through the dispensing tube 42 will pass out through the residue valve and back into the underground tank. When the lever 212 is raised as aforesaid, the pin 211ª carried thereby contacts with the cam 211ᵇ of the lever 145, which moves this lever so as to disengage the computer clutch and lock the same in disengaged position. This prevents any operation of the computer till the mechanism is released by a new set-up of the dispensing tube 42.

The air cylinders 150 and 196 are carried by a bracket 213, which is secured to the underside of the plate 127. This bracket also has extending outwardly therefrom a pin 214 and carries a pivoted lever 215. This lever is provided with a notch 216, which is adapted to receive a pin 217 carried by the lever 218, which lever is pivoted at 219 to the plate 127.

The lever 218 carries a pivoted dog or pawl 220, which is provided with a slot 221 through which a pin 222 carried by the arm 223 of the lever 218 projects. This dog constitutes the locking device and prevents the air cylinder 150 and its connected parts from operating when the device is in locked position and before a set-up of at least one gallon is made in the bowl 4.

The lever 218 (Figs. 5 and 6) is provided with a pin 224, which is designed to be contacted with by the inclined face 225 of a plate 226 carried by the rack 77. This will swing the lever 218 on its pivot 219 so that the arm 223 will contact with the pin 214 thus bringing the dog 220 in the path of travel of the head 147 of the piston rod 148 and when in this position the head 147 cannot contact with the roller 139.

When the lever 218 is swung into locking position the end face 227 of the triangular plate 226 bears against the pin 224 and prevents any swinging of the lever 218 in the one direction, while the pin 214 prevents its movement in the other direction but as soon as a set-up is made, the pawl 228 carried by the rack 77 contacts with the lever 215 raising it so that the notch 216 formed therein will release the pin 217 permitting the lever 218 to swing into the position illustrated in Fig. 5 by gravity. Of course, during this movement, it will be understood that the end 227 of the triangular plate 226 has moved away from the pin 224 so as to permit this movement.

At the same time the setting up of the device or of the dispensing tube will also cause the pawl 209 to contact with the end 208 of the lever 202 raising it and releasing the pin 211 thus permitting the arm 186 together with the roller to drop thereby placing the residue butterfly valve in position so that it can be closed. In other words, it releases the mechanism which has held the residue butterfly valve in locked open position and places the device in such a position that dispensing or the issuing of a ticket can be accomplished.

Carried by the link 170 is a pin 230, which pin contacts with the flange or turned-over edge 231 of the lever 181 and when the serving butterfly valve is opened, this pin raises the lever 181 so as to release the tooth 179 of the lever 178 from the notch 180. This permits the lever mechanism controlling the residue butterfly valve to drop closing this valve. This closing takes place before the serving valve is opened and before the lock lever 162 releases the stop on the serving rack. In this way, there would be no overlapping of actions of the two butterfly valves at the commencement of the serving because the residue butterfly valve will always close before the serving butterfly valve is fully opened and the serving commences, which serving, however, does not commence at any time until the serving pipe or tube 42 commences to lower since the only way that fluid can get from the bowl 4 is by over-flowing the top of the tube 42.

When the device is in locked position by reason of the pin 211 engaging with the tooth 207 the cam pawl 184 is in the position shown in Fig. 9 and thus prevents any possibility of the residue valve mechanism dropping and closing the residue valve and even when the pin 211 is released only the cam pawl 184 will drop and move in the direction of the arrow on Fig. 9 but the residue valve mechanism will still stay in its open position until the dispensing mechanism commences to work when the pin 230 carried by the lever 170 will raise the lever 181 releasing the tooth 179 from the notch 180 thereby permitting the lever 178 to fall. The movement of this lever is transmitted to the lever 182ª by the link 182. This permits the residue valve to close and stay closed until the lever 186 is again operated for printing and issuing the ticket and disconnecting the computer from the serving mechanism.

As the adjustable stops come down during the serving they come in contact successively with the pawl 163 raising its rear end and causing it to strike the pin 176ª which will raise or rock the lever 176 and release the pin 174 thus permitting the serving valve to close. In this way the serving valve closes each time a quantity unit is dispensed. This makes our device especially useful in serving fuel to internal combustion engine fuel tanks as the possibility of overflowing such tanks is eliminated.

Pivotally carried by the lever 159 is a lever 159ª. This lever is slotted as at 159ᵇ through which a pin 159ᶜ extends. This is to prevent the end 159ᵈ from tipping up or down. The purpose of the lever 159ª is to swing the lever 159 so that the lock lever can swing clear of the adjustable stops 110 during the setting up of the dispensing tube 42. This movement is obtained through the adjustable stops 110 striking the end 159ᵈ of the lever 159ª and pushing it upward and permitting the lock lever 162 to swing backward and clear the adjustable stops as they pass it on their upward or setting up travel.

The pipe 10 is always full of the fluid to be dispensed, the initial filling taking place when the bowl 4 is filled, and for this reason accurate measurement of fluid is obtained since when this pipe is full any additional fluid passing down through the dispensing tube 42 must pass out through either the dispensing or residue valves, and as these valves are both on a line there can be no difference in the liquid retained in the well during the closing of one valve and opening of the other.

Carried by the bracket 130 is a bracket 130ᵇ through which a shaft 234 extends. This shaft carries at one end a lever 235 (Fig. 27), which depends along one side of the bracket 130 and in the path of travel of a cam lever 233. The cam lever is carried by the bracket 130. This cam lever is pivoted at one end and is designed to be operated by a pin 233ª projecting from the lever 212 (Fig. 5) coming into contact with the lip or extension 233ᵇ formed on the cam lever 233 (Fig. 27) and when the cam lever 233 is raised it swings the depending lever 235 rocking the shaft 234. This in turn rotates a cam lever 236 carried by the opposite end of the shaft 234 thereby releasing the pin 238 in the lever 239 thus permitting this lever and the weight 240 to drop. The lever is held in raised position as shown by the dotted lines in Fig. 27 by the notch 237 formed in the cam lever 236. The arm 239 is pivotally carried by the bracket 232 at the point indicated by the numeral 241. As this arm descends the pin 238, which projects through the slot 238ª in the bracket 232, comes in contact with the arm 248 of the cam lever 247 which swings the lever into the position as shown by solid lines in Fig. 27. During this movement the end 246 of the lever 247 contacts with the arm 245 carried by the shaft 242. The lever 245 is mounted on one end of the shaft 242 and on the opposite end of this shaft is mounted an arm 243 which is designed to come in contact with and be operated by the pivoted dog 244 which is carried by the rack 109. This dog is operated only as the rack moves upward for a setting up, and when this movement takes place the lever 243 is raised upward swinging the lever 245 downward thus rocking the cam 247 and again raising the lever or arm 239 and weight 240.

During the downward movement of the arm 239 (Figs. 27 and 37) and the upward movement or rocking of the cam lever 247, the projection 249 of the lever 239 comes in contact sequentially with the ends 264 and 265 of the trip levers 266 and 267 respectively, the lever 266 controlling the operation of the printing mechanism and the lever 267 releasing the feed mechanism so it will be seen that from this construction the ticket is automatically printed and fed out without any separate manipulation by the operator.

Carried by the plate 127 is the support 127ª (Fig. 32), which may form one side of the computer housing, and carried by this support is a shaft 121ª (Figs. 33 and 34), which shaft extends through the column 2 and is in alignment with the shaft 121. The shaft 121ª has secured on one end a clutch member 122ª, which is adapted to be engaged with the clutch member 122.

Figure 44:
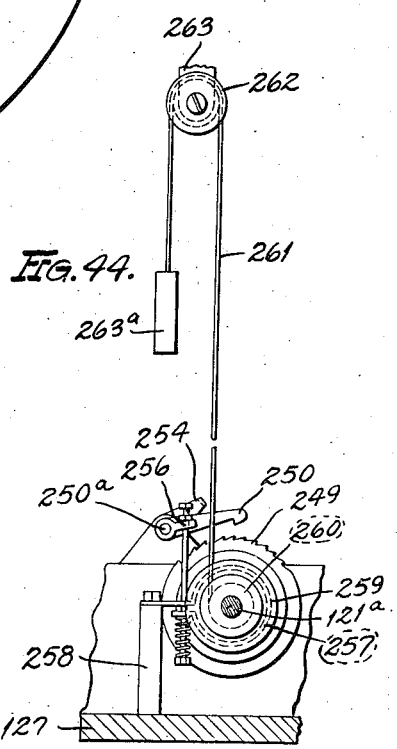
Fig. 44 is a side elevation of the mechanism employed for returning or clearing the computing mechanism after a ticket has been printed.
Figure 17:
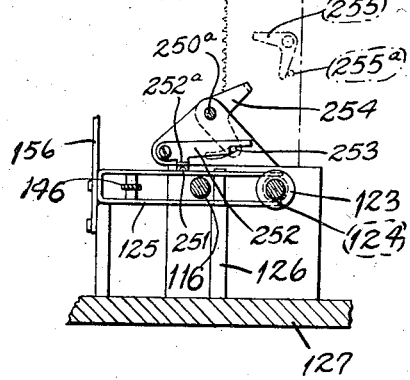
Fig. 17 is a view with parts in section showing the mechanism employed for shifting the clutch and locking the computing mechanism against retrograde movement.

Adjacent the clutch member 122ª is a ratchet wheel 249 with which a ratchet pawl 250 is adapted to engage (Fig. 44). On the lever 125 (Figs. 17 and 29) is a pin 251 having a round head, which contacts with and rides under the inclined arm 252ᵃ of the locking pawl 252 and raises it so that the pawl will release the pin 253 carried by the clutch lock 254 thus permitting the pawl 250 to drop down and engage with the ratchet wheel holding the computing mechanism in a set-up position thereby preventing the accumulator or computing mechanism from clearing or running in a reverse direction when the clutch members are disengaged. The clutch lock 254 is operated by a pivoted dog 255, which is carried by the rack 109 adjacent its upper end and which moves freely in one direction only, that is in its downward movement, and which contacts with the pin 255ᵃ on the rack 109 when the rack moves upwardly thus tipping up or raising the clutch lock 254 as shown in Fig. 17 and thus turns the shaft 250A to which the ratchet pawl 250 is fixed and raises this pawl wheel from the ratchet 249.

At the same time the lever 256 on the shaft 250A is also raised thereby tightening up the brake-band 257, which is carried by the post 258 projecting upward from the plate 127. The brake-band passes around a brake drum 259 carried by the shaft 121ᵃ. The purpose of this brake-band will be explained later. A drum 260 is also carried by the shaft 121ᵃ and to this drum is attached one end of a flexible member or tape 261. This flexible member then passes upward over a sheave wheel 262 carried by a bracket 263, which in turn is carried by the underside of the flange 3. To the free end of the flexible member or tape 261 is secured a weight 263ᵃ. This weight is used to clear the computer of its accumulations. The brake-band aforementioned prevents the weight from descending too rapidly.

As the computer is operated to accumulate the total sales price and the unit quantity dispensed, the weight is raised by the winding up of the flexible member or tape 261 on the drum 260. This weight, however, is prevented from falling by reason of the ratchet pawl 250 engaging with the ratchet wheel 249. This permits the shaft 121ᵃ, which operates the computer mechanism, to operate in one direction only until it is released by the tripping of the clutch locking pawl 254 on the next set-up. So, in this way, no clearing of the computer can take place until a new set-up has been commenced.

Figure 32:
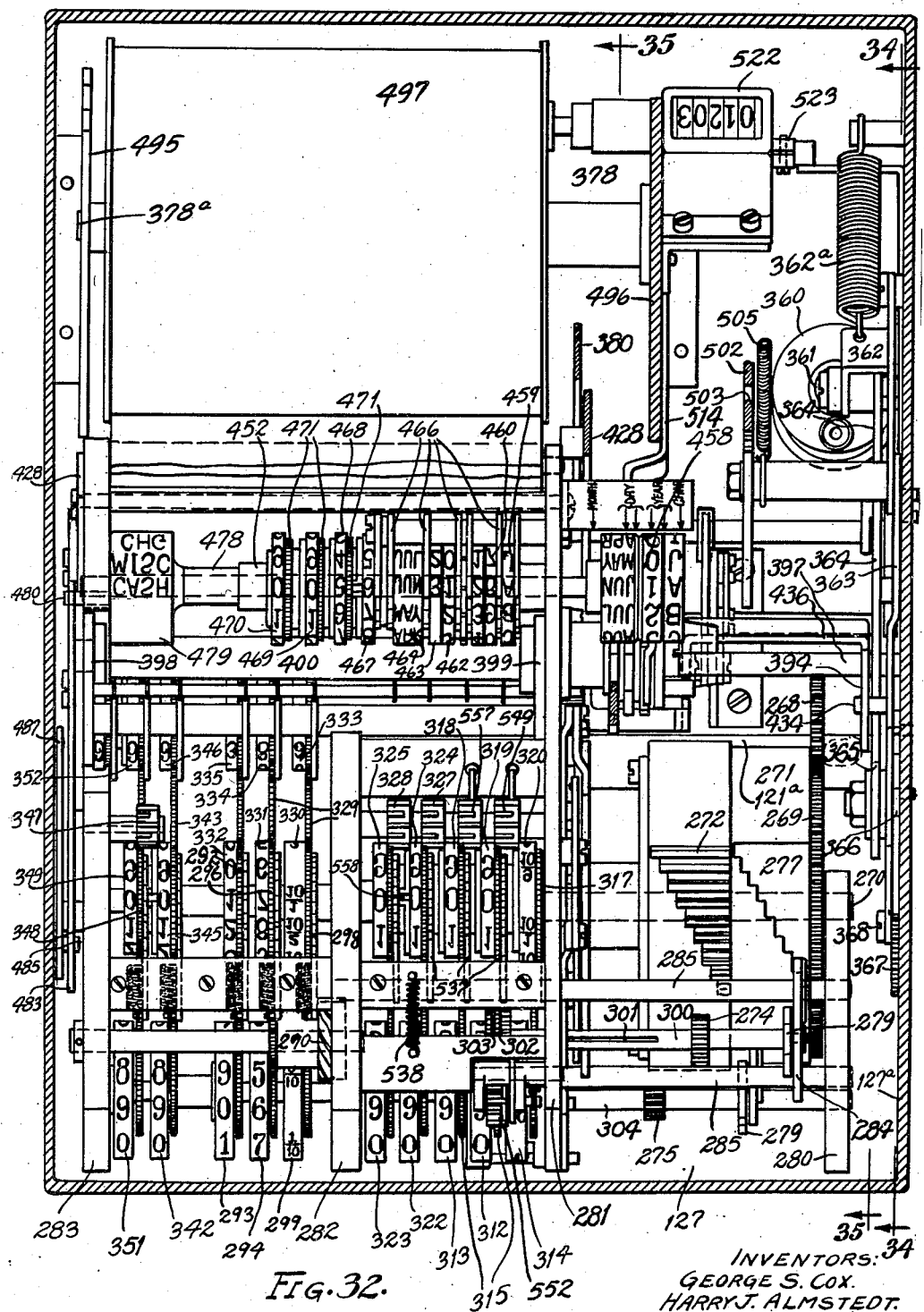
Fig. 32 is a horizontal section of the same taken above the computing mechanism.

Carried by the shaft 121ᵃ and located within the computer housing is a gear 268 which meshes with a gear 269. This last mentioned gear is mounted on a shaft 270 which carries a drum 271 (Figs. 31 and 32). The gearing is so proportioned that the drum will make only a one-half revolution for each complete revolution of the clutch. The drum is provided on its face with diametrically opposite racks 272 and 273 having nine teeth. The teeth are arranged along the inner edge of the drum and gradually decrease in length so that as the carrying pinions 274, 275 and 276 (Fig. 33) are moved across the face of the drum, the number of rack teeth engaging therewith can be increased or diminished. The purpose of this will be explained in detail later. Adjacent the outer edge of the drum and in alignment with the racks are recesses 277 and 278 (Figs. 31, 33 and 40) which increase in width step by step as the rack teeth increase in length. These recesses permit the locking wheels 279 (Figs. 31 and 33) to turn only while either of the driving pinions 274, 275 or 276 (Fig. 33) are in mesh with the racks, and during the remainder of the revolution of the drum one of their angular faces is in contact with the face of the drum, thereby preventing their turning, and since these locking wheels are fixed to the shafts on which the various driving and carrying pinions are mounted, it follows that there can be no accidental turning of these shafts unless the driving pinions are in mesh with the racks. The locking wheels are substantially of octagonal shape but have their faces dished or hollowed out so as to fit snugly against the face of the drum 271 and the only time that these locking wheels can turn is when they are over the recesses so that the corners can pass into the same. When in this position the driving pinions are unlocked and are rotated by the racks 272 and 273.

It is also essential that the driving pinions have the same number of teeth as the locking wheels have faces as otherwise the mechanism would and could not operate. It is also essential that the recesses be so formed that as soon as the driving pinions engage with the rack the locking wheels will release and again lock when the driving pinions leave the racks. The shaft 270, which carries the drum 271, is mounted in brackets 280 and 281 (Fig. 31) located on the inside of the computer housing.

Located within the computer housing are brackets 282 and 283 and located between the last three mentioned brackets are mounted the unit quantity register wheels, the price per unit quantity register wheels, the total computed sales price wheels together with the printing wheels for the above data as well as the ticket dating and numbering wheels, as will be hereinafter more fully described.

The shafts, on which the driving pinions and locking wheels are mounted, are provided on their outer ends with supporting yokes 284, which are slidably mounted on rods or shafts 285 which are carried by the brackets 280 and 281. These yokes and rods permit the longitudinal movement of the shafts on which the driving pinions and locking wheels are mounted.

Each of the yokes is also provided with a sleeve 286 which surrounds one of the rods 285. These sleeves are each provided with a rack 287 (Fig. 31), which racks are meshed with worms 288, 289 and 290 (Figs. 31 and 40). The worm 289 is operated by gears 291 and 292, which last mentioned gear is placed in operation by the turning of the tens registering wheel 293 of the unit quantity price register. The worm 290 is operated by turning the unit registering wheel 294 of the unit quantity price register through the gears 295 and 296 and the worm 288 through a train of gears 297 and 298 operated by the fraction registering wheel 299 of the unit quantity price register, and it is through this arrangement of these gears and the consequent rotation of the various worms that the driving pinions and locking wheels are moved across the face of the drum so that the carrying pinions will engage with a predetermined number of the rack teeth and thereby operate the total sales price and totalizer.

The driving pinion 274 is mounted on the shaft 300 (Fig. 32). This shaft is provided with a keyway 301 and on this shaft are mounted gears 302 and 303. The gear 302 is provided with a key while the gear 303 is loosely mounted on the shaft. The purpose of this will be explained in detail later. The driving pinion 275 is mounted on a shaft 304 which is provided with a keyway 305 and on this shaft are mounted gears 306 and 307, the gear 307 in this instance having the key.

The driving pinion 276 is mounted on a shaft 308 which is provided with a key 309 and on this shaft are mounted gears 310 and 311, the gear 311 having the key while the gear 310 is loosely mounted.

The gears 302 and 303, which are driven by the driving pinion 274, operate the unit wheel 312 of the total sales price computer. The gears operated by the driving pinion 275 control the operation of the tens wheel 313 of the total sales price computer and the gears operated by the driving pinion 276 operate the fractions register wheel 314 of the total sales price register. Each of the wheels 312, 313 and 314 are provided with gears or pinions 315 which in turn operate idler gears 316. These idler gears also mesh with gears 317, which gears are carried by the printing disks 318, 319, and 320, being respectively the tens, units and fractions wheels of the total sales price recording and printing mechanisms. These gears also mesh with gears 321, which gears are carried by similar wheels on the totalizer, which makes a permanent or total recording of the entire amount or entire price of liquid sold and dispensed from the pump during any given period of time, such as weekly or monthly.

Mounted on the shaft, which carries the register wheels 312, 313 and 314, are register wheels 322 and 323. These wheels indicate two columns of dollars: the other three wheels before mentioned indicating two columns of cents and one column of fractions. The shaft which carries the recording and printing wheels 318, 319 and 320 also carries wheels 324 and 325, which correspond to the wheels 322 and 323. The totalizer also carries corresponding wheels.

The last two mentioned sets of wheels are driven by idler gears 326. These idler gears are driven only when the wheels 324 and 325 are operated by means of gears 327, and 328. The gear 328 is so arranged that it will rotate the wheel 325 one number every time the wheel 324 makes a complete revolution. In other words, it carries the computation made on the wheel 324 by one complete revolution up into the next higher column and, in so doing, the wheels 326 carry this computation into the wheels 323 and into similar wheels on the totalizer. The gears, which are carried by the unit price indicator wheels, mesh with gears 329 so that when these wheels are operated to set the price per quantity unit, the gears will also set the price per quantity unit and the recording and printing wheels 330, 331 and 332 and simultaneously therewith transfer this price so set up to the wheels 333, 334 and 335 of the totalizer so that the total selling price on the permanent record made by the totalizer will always agree with the price per quantity unit and also with the particular number of quantity units sold at each and every sale. This permits a complete checking up between the daily sales record and the total sales record whenever it is removed.

On the shaft 121$^a$ is mounted a gear 336 (Fig. 43). This gear is provided with a single tooth only and meshes with a gear 337, which in turn drives the gear 338, this gear being mounted on a shaft 339. The shaft 339 carries gears 340 and 341 and are for the purpose of operating the unit register 342 by means of the idler gear 343. This gear is so arranged that on one complete revolution of the shaft 121$^a$, which will be made when a unit quantity is dispensed, the gear 337 will be rotated one tooth only thus causing the register wheel 342 to be advanced one number. The gear 343 also operates the printing wheel 345 and the registering and printing wheel 346 on the totalizer. A gear 347 is provided which meshes with the gear 348 carried by the tens registering wheel 349 of the total unit dispensing recording and printing wheel and through the idler gear 350 the tens register wheel 351 and the totalizer tens recording and printing wheel 352 are operated. The gear 347, however, is operated so as to advance one number on the wheels 349, 351, and 352 for each complete revolution of the wheel 345 and in this way the total number of quantity units dispensed at any one operation can be easily arrived at.

The idler gears 316, 326, 329, 343 and 350 are so mounted as to rotate freely on the sleeve 353. The sleeve 353 carries a sliding shaft 354 to the outer end of which is secured a pivoted handle 355. This shaft 354 is freely slidable within the sleeve 353 and carries a spring actuated pawl or key 356, which passes through a slot 357 formed in the sleeve 353 so that as the shaft 354 is moved longitudinally the end 358 of the key or pawl 356 will travel in the keyways 359 formed in the idler gears 329, and it is by this means that these idler gears may be rotated so as to accomplish a setting of the unit quantity price.

In other words, it permits a ready changing of these prices and through this changing of prices the movement across the face of the drum of the various driving pinions 274, 275 and 276 is accomplished so that these gears may engage with a predetermined number of rack teeth carried by the drum 271. It is to be understood, of course, that the price per quantity unit is changed not only on the register but also on the recording and printing wheels and on the totalizer simultaneously. The manipulation of the totalizer during the setting of the unit quantity sales price will be explained in detail later.

Located within the computer housing is a control cylinder 360 (Fig. 32). This control cylinder is constructed in the same manner as the control cylinder 29 previously referred to or controls the operation, or at least the quickness thereof, of the issuing of the sales tickets, the rewinding of the daily sales record slip and total sales record slip, and also the feeding of the printing ribbon.

Extending upward from the control cylinder 360 is a piston rod 361 (Fig. 34), which is pivotally attached to an arm 362 forming part of the cam lever 363. A lever 364 is also pivotally attached to the piston 361, the opposite end of this lever being bifurcated as indicated by the numeral 365 so that it will fit around the shaft 366 on which a segmental gear 367 is mounted. The lever 363 is pivotally attached to the segmental gear 367 at the point indicated by the numeral 368.

Carried by the lever 364 is a roller 369 (Fig. 34), which is in contact with a cam 370 mounted on the shaft 242. The purpose of this cam and roller is to place the device in printing position during the setting-up of the device and when in this position the segmental gear 367 is in position illustrated in Fig. 35. The segmental gear 367 is provided with a projecting lug 371, which is adapted to be engaged with by the notch 372 of the lever 267 so as to hold the segmental gear ready for feeding the sales ticket. This is done by engagement of the segmental gear with a pinion 373 carried by the feed roller 374. This feed roller also serves as a platen in that during the printing it causes the sales ticket and the daily record ticket to come in contact with the recording register wheels which will print the total number of gallons or quantity units of liquid sold, the unit price thereof, and the total sales price.

The pinion 373 (Figs. 33 and 34) is arranged to rotate in both directions and, in order to prevent the feed roller 374 from rotating in the opposite directions (Fig. 36), a spring actuated pawl 375 meshing with a ratchet wheel 376 are employed on the shaft which carries the roller 374 so that when this gear is rotated in one direction the feed roller will rotate and feed out paper or the sales slip, but when the segmental gear 367 moves in the opposite direction the gear can rotate freely without manipulating the feed roller. The feed roller 374 is carried by an arm 377, which is pivoted on the shaft 378. The free end of the arm 377 has attached thereto a spring 379, which tends to pull the arm downward when the printing mechanism releases.

Pivotally attached to the arm 377 is a link 380 (Fig. 35), which is provided adjacent its lower end with a notch 381, which engages with a pin 382 and supports the paper or the various strips comprising the daily sales ticket and the customer's sales ticket in elevated position above the recording and printing register wheels so that this paper can travel freely and without any contact with these wheels. The arm or lever 380 is held in normal position by means of a spring 383 so that when the lever 380 is moved backward by means of the cam 384, this spring will be placed under tension but upon the return of the cam 384, which controls a portion of the printing mechanism, to the position illustrated in Fig. 37, the tension of this spring will draw the arm or lever 380 toward the pin 382 and permit it to snap over this pin so that the notch 381 will hold the arm 377 and the platen in elevated position.

Inasmuch as the platen is supported by two complementary arms and both are substantially alike, we have only described the arm 377 as this bears most of the mechanism, the arm on the opposite side of the platen being merely a support therefor. The cam 384 is mounted on a shaft 385, which when rotated in one direction moves the cam 384 so as to move the link 380 and release the notch 381 from the pin 382. A similar movement occurs on the opposite support for the platen. The platen arms are pulled downward at their forward ends by springs 379 thus causing the feed roller 374 to strike a sharp blow on the recording register wheels thereby printing the customer's sales ticket and also the daily sales record, and simultaneously with this printing a resilient spring controlled member 388 comes in contact with the printing wheels, which print the kind of sale made, a ticket number, the date, and a serial number on the customer's sales ticket, and also on the daily sales record slip.

The arms 377 (Figs. 33, 34 and 35) also carry a pressure roller 389 which bears against the feed roller 374 so that when this feed roller turns the paper passed between these rollers will be fed forward. The cam 384 is operated by a lever or arm 390, which is spring controlled in one direction by the spring 391 but is moved in the opposite direction by the pivoted pawl 392, which is carried by the lower end 393 of the cam lever 266. At the time this tripping takes place, the levers 363 and 364 are in the position indicated in Fig. 34, the spring 362$^a$ under tension, and then the segmental gear 367 in the position shown in Fig. 35 where it is held by the trip lever 267 as shown in the above figure. Pivotally carried by the bracket 281 is a bent lever 394 having a slot 395 adjacent its upper end and through which a pin 396 carried by the lever 363 passes and on the forward movement of this lever the bent lever 393 is moved forwardly about its pivot 397.

The totalizer disks (Figs. 31 and 33) are carried by a shaft which has bearing in the lower ends of the arms 398 and 399, which arms are secured to a shaft 400. The shaft 400 has secured thereto an arm 401, which has toggle levers 402 and 403 secured at its lower ends. These toggle levers are actuated by a cam 404 mounted on the shaft 385$^a$. The shaft 385$^a$ has secured thereto a lever 405, which has extending therefrom a pin 406, which pin engages with a tooth 407 carried by a sliding and tilting lever or cam 408.

The arm 401 is normally in pulled backward direction by a coil spring 401$^a$ which causes the totalizer to strike a sharp blow against the platen 420 at the time of printing as will be hereafter described.

The lever or cam 408 (Fig. 33) is provided with slots 409 and 410 through which pins 411 and 412 extend. The slot 410 is provided with an upwardly extending recess 413 so that the pin 412 can pass therein when the ratchet tooth 414 moves in a retrograde movement over the tooth 415 formed on the front end of the tilting lever 408 as is the case when the computer is cleared after printing a ticket. When the totalizer 321 is thrown into engagement by reason of contact of the cam 404 with the toggle levers 402 and 403, the totalizer is held in engaged position as shown in Fig. 33 by means of the latch lever 416, which engages with a tooth 417 formed on the bracket 418. In order to disengage the latch 416 from the tooth 417, a cam lever 419 is employed, this cam lever, moving in the direction of the arrow indicated in Fig. 33, raising the lever or latch lever 416 and permitting the totalizer to swing backward against the paper passing around the platen 420 over which the record sheet passes. The lever 416 is provided with a notch 421, which is adapted to engage with the tooth 417 in such a manner as to hold the totalizer 321 in neutral position. By neutral position is meant that the gear wheels of the totalizer are not in mesh with the gear wheels or idler gears of the computing register nor are the numerals carried by the totalizer in contact with the total sales record slip. In this way the totalizer will be held substantially midway between these two positions so that it will not operate either during the issuing of a miscellaneous sales ticket, nor will it operate during the setting up of the device for the issuing of such a ticket.

It will be noted from Fig. 33 that the notch or recess 421 is provided with an inclined face 422. This is to permit the totalizer to be moved forward from neutral position sufficiently when it is desired to change the unit quantity price, which frequently happens so that the total sales price when printed on the totalizer can be checked up with the unit quantity price. This is done by having the arm 399 provided with a downwardly extending projection 423, which engages with a cam 424. This cam is carried by a shaft 425, which shaft is operated by a pivoted key or handle similar to the key or handle 355. The cam, however, only gives sufficient throw to the arms and the shaft carrying the totalizer wheels so that the gears carried thereby are partially in mesh and without the possibility of locking it in engaged position, but at the same time permits sufficient engagement of the gears that, by the setting of the unit quantity price, the unit quantity price wheels on the totalizer can also be changed simultaneously.

The arm 401 (Fig. 33) is also provided with a notch 426, which permits it to swing rearward under the action of the spring 401$^a$ in order that the totalizer can swing back and strike the platen 420 simultaneously with the lowering of the arms 377. This lowering is permitted by the tooth 427 of the arms 428 dropping into one of the notches formed on the ratchet wheels 429. These ratchet wheels are rotated by a pawl 430 engaging with a ratchet wheel 431, which wheel, as well as the wheels 429, are mounted on a shaft 432 carried by the side frames 281 and 283. The pawl 430 is carried by a plate 433, which is also pivotally mounted on the shaft 432. The plate 433 has a pin 434 projecting therefrom which engages with a slot 435 formed in the upper end of the lever 436. The lever 436 is pivoted at its lower end on the pivot 397 and in reality is a part of the bent lever 394.

A pawl 437 is also carried by the lever 436 adjacent its lower end, which engages with a ratchet wheel 438, which is mounted on the shaft 439 on which the platen 420 is mounted, and during the movement of the bent lever this platen is turned a predetermined distance so as to prevent the totalizer from always striking the same spot thereon as well as to assist in feeding the totalizer strip after the printing has been done.

Mounted on a shaft 440 is a printing ribbon winding spool 441 (Figs. 33, 35 and 37), which is actuated through the shaft 440 by the ratchet pawl 443, which is carried by a rocking lever 444. The rocking lever 444 has its upper end 445 contacting with the pin 446, which, on the forward movement of the bent lever, will cause the tooth on the pawl 443 to operate the ribbon winding spool 441 to rotate a certain distance. This distance of rotation, however, is predetermined by the end 447 of the pawl 443, which end rides on a pin 448 for a certain distance and then the inclined surface 449 rides up on this pin and disengages the pawl tooth from the ratchet wheel 442 and in this way the feeding of the printing ribbon from the spool 568A is controlled, it being understood, of course, that the printing ribbon passes all of the registering recording wheels including the totalizer so that only one printing ribbon is needed. The customer's sales slip has a carbon back so that it and the daily sales slips will be printed simultaneously. The upper ends 450 of the arms 428 are beveled and contact with pins 451 carried by the arms 377 and thus raise these arms immediately after the printing is completed so that the customer's sales slip and the daily record slips will not be dragged over the register recording and printing disks and thereby blur the same.

Carried by the brackets 281 and 283 is a shaft 452 having a reduced portion 453. The shaft is also made hollow so as to receive an auxiliary shaft 454. The shaft 452 is provided with a key-way 455 through which the end 456 of a spring actuated pawl 457 extends. The shaft 454 has attached to its outer end a knob 458, which knob bears the months, numerals to represent the days of the month, and suitable characters which indicate either the series of the ticket or the character designating the individual salesman.

Mounted on the shaft 452 are registering and printing wheels 459, 460, 461, 462, 463, and 464 (Fig. 32). Each of these wheels are provided with a key-way 465 in which the tooth 456 of the pawl 457 extends. These wheels are loosely mounted but are prevented against accidental turning by means of spring actuated pawls 466 so that when these are once set no operation of the shaft will turn them. Loosely mounted on the shaft 452 are wheels 467, 468, 469 and 470. These wheels are provided with gear teeth 471, these gear teeth being adjacent the faces of the wheels, which faces bear numerals so that the tickets may be consecutively numbered.

Carried by the shaft 432 is a gear 472 which in turn meshes with a gear 473. This gear in turn meshes with a gear 474, carried by the shaft 475. This shaft also carries a ratchet wheel 476, which is designed to mesh with the teeth of a gear 477 carried by the numbering disk 467. In this way every time the ratchet wheel 431 is turned by the operation of the ticket issuing device, the serial numbering of the ticket will be advanced one number automatically and this number will be gradually carried up into the next higher columns as the operation continues.

Mounted on the shaft or the reduced portion 453 of the shaft 452 (Fig. 32) is a sleeve 478, which is divided with an enlargement 479 at one end. This enlargement bears certain symbols indicating the character of a sale, whether the sale is for cash, whether it is a miscellaneous sale, or whether the item is to be charged. The disk 479 is provided with a pin 480 (Fig. 39), which projects through an arcuate slot 481 formed in the bracket 283. The pin 480 extends through a slot 482 formed in a sliding lever 483. This lever is provided with a downwardly extending portion 484 which is provided with a pin 485, the pin projecting through a slot 486 formed in the lower end of the lever 487. This lever extends through the top of the computer housing. The lever is normally held in a predetermined position by means of a spring 488. The sliding lever 483 is provided with a plurality of teeth 489, which are adapted to engage with the tooth 490 formed on one end of the rocking lever 491. This lever is also normally held in a predetermined position by means of the spring 492. The lever 491 is pivoted to the bracket 283 at the point indicated by the numeral 493. This lever also has on its opposite end a tooth 494 which engages with the notches formed on the wheel 429.

The normal position of the device just explained is to have the symbol for a cash sale in printing position. When it is desired to change this character so as to get the impression "Miscellaneous" the lever 487 is moved in the direction indicated by the arrow. This movement will cause one of the teeth 489 to depress one end of the lever 491 until the tooth 490 drops into the recess between the teeth. When this has been done, the character "Miscellaneous" will be uppermost and be ready to be impressed on the sales ticket.

As soon as the printing has been done, the wheel 429 commences to rotate raising the end 494 (Fig. 39) of the lever 491 and disengaging the tooth 490 from the recess in which it was seated thus permitting the spring 488 to act and bring the lever 487 back to its starting position.

When the charge symbol is to be brought uppermost the lever 487 is moved to its farthest position: in other words, the tooth 490 passes both teeth 489 and engages with the recess at the rear of the last tooth but immediately after printing this symbol is released and the device again returned to the cash sale station.

The top of the computer housing is preferably so arranged that the operator can tell just when he has this symbol printing device in the proper position. This is clearly illustrated in Fig. 40.

Carried by the brackets 495 and 496 are the arms 377 between which is mounted a rewinding roller 497. The shafts 378 and 378ᵃ however do not extend entirely through the rewinding roller 497 but only a short distance therein from each end so that the roller can be readily removed. The shaft 378 has fixed thereon a ratchet wheel 498 which engages with a ratchet pawl 499, pivotally carried by a disk 500. This disk is loosely mounted on the shaft 378 and has secured to its opposite face a pinion 501 which meshes with a rack 502. The lower end of the rack is provided with a slot 503 through which a pin 504 passes. This pin also serves as a pivot between the arm 362 and the cam lever 363.

A coil spring 505 is attached at one end to the pin 504, its opposite end being attached to a pin 506 carried by the rack 502 adjacent its upper end. The purpose of this spring is to form a yielding connection between the rack 502 and the pin 504 as this pin has a fixed amount of movement while the movement of the rack gradually grows less as the diameter of the rewinding roll increases, and were it not for this flexible or yielding connection either an increasing length of paper would be rewound on the daily record slip or else the paper would be placed under a gradually increasing tension so that it would eventually tear. And by reason of the ratchet and pawl the rewinding roller 497 is rotated in one direction only although the gear 501 is rotated in opposite directions alternately.

Secured to the arms 377 are brackets 507, which support a plate 508. This plate has its ends 509 bent downwardly so that the paper will slip thereover. This plate fits in the cutaway portion 510 formed in the computer housing and remains in fixed position even when the computer housing is removed.

The arms 428 are provided adjacent their lower ends with an opening 511 and in one of these openings is secured a stud 512 which passes through a slot 513 formed adjacent one end of a lever 514. The lever 514 is resiliently connected to the stud 512 by a coil spring 515. Adjacent the opposite end of the lever 514 is a slot 516 through which a stud 517 passes. The lever 514 is also provided with a tooth 518 which engages with a ratchet wheel 519 mounted on the shaft 520 which carries the totalizer rewinding roll 521.

The slot 516, however, is wider than the diameter of the stud 517 so that when the lever 514 is drawn in one direction the tooth 518 can ride over the ratchet teeth in the wheel 519 by raising the lever 514 and therefore the totalizer rewinding roll is operated in one direction only. The spring 515 forms a compensating connection between the stud 512 and the lever 514 to compensate for the gradual increase in diameter of the rewinding of the totalizer roll, the same as the spring 505 compensates for the increase in diameter of the daily sales slip rewinding roll.

Carried by the bracket 496 is a counter 522 (Fig. 34), which has a depending swinging arm 523, the end of which contacts with one end of the arm 524. This arm is provided with slots 525 through which studs 526 project so that the arm 524 can slide longitudinally. A coil spring 527 normally holds the arm 524 in retracted position. Pivotally secured to the arm 524 at the point indicated by the numeral 528 is a trip lever 529, which has a stop 530 formed thereon, which is adapted to contact with the lower edge of the arm 524 and limit its downward movement so that the end of the trip lever 529 will be engaged by the ratchet tooth 414 of the ratchet carried by the shaft 121ᵃ when turned in one direction, but can ride thereover when the ratchet is turned in the opposite direction. This retrograde movement occurs when the computer is cleared after printing and issuing a ticket. The counter 522 is for the purpose of indicating the total number of liquid units dispensed and forms a continuous indication, it never being set back.

Carried by the shaft 270 (Fig. 38) is a disk 531, which is provided on its periphery with a plurality of projections 532, which are designed to contact with a pin 533. Carried by one end of a pivoted lever 534 to the opposite end of the lever 534 is attached a sliding bar 535, which bar is provided with a plurality of spaced apart teeth 536. These teeth are pointed so as to fit in the recesses of the star wheels 537 carried by the recording register wheels 318, 319, 320, 324 and 325. The teeth 536 and bar 535 are normally held in retracted position by a coil spring 538 and are only moved forward and into engagement when one of the projections 532 contacts with the pin 533 so as to rock the lever 534. The purpose of these teeth primarily is to insure the alignment of the numerals on the recording register wheels but in addition they also prevent accidental jumping of these wheels during the time the carryover pinions are moved into and out of mesh, as will be explained in detail later.

Mounted on the shaft 270 (Fig. 38) are cam disks 539 and 540 which are adapted to have their cam surfaces contact with rocking levers 541 and 542. The rocking lever 541 is provided with projecting teeth 543 and 544 and the rocking arm 542 with teeth 545 and 546. These teeth are designed to contact alternately with the cam surfaces formed on the cams 539 and 540, that is the tooth 544 contacts with the cam surface formed on the cam 539 while the tooth 543 contacts with the cam surface on the cam 540. Likewise the tooth 545 contacts with a cam surface on the cam 540 while the cam 546 contacts with a cam surface on the cam 539.

Carried by the rocking lever 541 (Fig. 38) is a lever 547 in which a shaft 548 of the carry over pinion 549 extends. This carry over pinion is pivotally carried by the bracket 281. The lever 547 has an extension 550 in which is secured a shaft 551 of the carry over pinion 552.

The rocking lever 542 has attached thereto a lever 553 in which the shaft 554 of the carry over pinion 555 is secured. A lever 556 connects the shaft 554 with a shaft on which the carry over pinion 557 is mounted.

By these connections and levers when the carry over pinion 549 is thrown in mesh with the gear carried by the recording registering wheel 319 the carry over pinion 552, which meshes with the gear carried by the indicating wheel 312, is thrown out of mesh but at the same time that this occurs the carry over pinion 555 is thrown in mesh with the gears 306 and 307 while the carry over pinion 557 is thrown out of mesh. This movement occurs alternately during the operation of the machine and permits the accumulation to be carried from one column into the next higher column. This is accomplished by furnishing both the recording registering wheels and the registering wheels with a notch 558 which, during a complete revolution, will come in contact with certain of the gear teeth of the carry over pinions and advance the next higher column disk one number. In this way, computation is carried on upward as the various registers are rotated and by reason of the peculiar arrangement of rock levers and the cams 539 and 540, this position, that is the meshing and unmeshing of the carry over pinions, is automatically taken care of and only operates at the time that this carrying on should take place.

The brackets 495 and 496 also carry a roll of double paper which constitutes the customer's sales ticket 650 and a daily sales record slip 561 and in order to keep the roll 559, under a proper tension and to prevent it from unrolling too freely a weighted or heavy roller 562 is employed. This roller is provided at its ends with trunnions 563 which fit in slots 564 formed in the brackets 495 and 496 so that this weighted roller will automatically follow down and bear against the roll 559 till it is used up and thereby prevents any slack from forming. A guide roller 564A is carried by the brackets 281 and 283 over which this double roll of paper passes. The brackets 281 and 283 also carry rollers 565, 566 and 567 over which the printing ribbon 568 passes so as to bring this ribbon past the various printing stations and thereby enabling us to use only one printing ribbon. The totalizer strip 569 is fed from a roll 570 carried by trunnions 571 which are supported in the brackets 495 and 496. It then passes around the platen 420 and to the rewinding roller 521 and inasmuch as the totalizer strip is not moved to any great extent during the issuance of a ticket, we have not deemed it necessary to disclose any tension devices but hereby reserve the right to make such addition, if needed, without departing from the spirit of our invention.

The plate 127 is provided with a slotted projection 572 in which a lever 573 is pivotally mounted. The lower end 574 of this lever extends into the bifurcation 575 of the bell crank lever 74. Its opposite end 576 is adapted to be actuated by the flat portion 185 of the cam 135 thereby rocking the same and moving the plate 73 thereby swinging the cross arm 63 into the position indicated by dotted lines in Fig. 15 thus permitting the dispensing tube 42 to lower for the draining of the bowl 4 without lowering any of the remaining unit quantity indicating symbols: as for instance, if the device is set for seven quantity units and only three thereof are dispensed on the issuing of a sales slip, the symbol 7 remains standing, indicating the original unit quantity in the bowl. Then the unit quantity symbol six will be lowered at the time the dispensing of the second quantity unit commences and the symbol five at the commencement of the third quantity unit dispensation, so that when three quantity units have been dispensed and a sales ticket issued, the symbols, 1, 2, 3, 4 and 7 will remain visible to the purchaser and it is only a simple matter of deduction to subtract the highest number or symbol remaining in the bowl 4 at its lower end from the number or symbol originally set up in the bowl 4 and arrive at the number of quantity units received, in this instance, it being three. It is important to note that the symbols left standing after the cross arm 63 is turned out of operative position must remain there till a new set-up for further dispensing is made. As soon as a new set-up is commenced and before a quantity unit has been set up, the cam 135 is permitted to return to its original position releasing the end 576 of the lever 573 thus permitting the spring 577 to draw the bell crank lever 74 and the plate 73 to their original positions and bring the cross arm 63 to the position shown in solid lines in Fig. 15 and ready to set up the unit quantity symbols.

The operation of our device is as follows:

The first step is to remove the computer housing and place the roll 559, which comprises the customer's ticket and the daily sales record slip, and the roll 570, comprising a totalizer roll, in position. The strips of paper comprising the roll 559 are then passed over the roller 564A: thence over the recording and printing register wheels, then around the feed roller 374 so that they will pass between this roller and the tension roll 389. The customer's ticket slip 560 is then raised from the daily sales record slip 561 and the end of this slip is then secured to the rewinding roller 497.

The totalizer strip 569 is passed from its roll 570 around the platen 420 and then on to the rewinding roll 521 but prior to threading these various rolls, the printing ribbon roller 568A is placed in position as indicated in Fig. 33. The end of the ribbon is then brought over the recording register wheels, which print the total number of quantity units sold, the price per quantity unit, and the total sales price. From there this ribbon passes over the symbols indicating the month, the date, the ticket number, the kind of sale, and the serial number of the ticket. Thence over the rollers 565, 566 and 567: then down in front of the platen 420 and finally around the rewinding roll 441. This completes the arrangement of the various slips and printing ribbon.

The next step is to set the unit quantity wheels price. Assuming that all of the mechanism is set at zero, the first step is to set up the unit quantity sales price. This is done by first operating the cam 424 so as to bring the totalizer partly in mesh with the various idler gears. Then the price indicating wheels 330, 331 and 332 are independently manipulated by sliding the pawl 356 in the slot 357 and turning each of the wheels, that is the wheels indicating the tenths, the units and the tens, to their proper position. This simultaneously sets up the unit quantity price in the totalizer. The cam 424 is then released so that the totalizer will swing into neutral position where it is held as aforesaid by the latch lever 416.

The net step, after this preliminary setting up has been made, is to operate the handle 19, which will operate the liquid pump and also the air pump. In this connection it is to be understood that the residue release valve is open and the dispensing tube 42 is down at its lowermost position so that any liquid pumped into the dispensing bowl will immediately flow back into the storage tank. The purpose of this preliminary pumping is to set up sufficient air pressure in the air tank 27 so that the various valves can be operated as will be hereinafter described.

The unit quantity indicating symbols in the bowl 4 are all tilted backward so as to be invisible. The device is now ready for dispensing liquid.

The first step is to ascertain from the customer approximately what liquid quantity he desires or thinks he will need. When this is ascertained, the spring actuated pawl 85, which is carried by the arm 86, is raised by means of the knob 104 and the arm rotated so as to bring it in substantial alignment with the unit quantity desired. Then the handle 90 is pulled outward releasing the pin 101 from the recesses 83 formed in the disk 82.

The handle 90 is then rotated until the pin strikes the arm 86 thus preventing further movement. The handle 90 is then released allowing the pin to drop into one of the recesses 83. During this operation the gear 78 has been rotated and this gear meshing with the rack 77 raises the yoke 37 thereby raising the dispensing tube, which carries the cross arm 63 at its upper end. As this cross arm raises, it comes in contact, through certain of its levers, with the arms 47 thereby raising the quantity indicating symbols 50 as it passes them; these symbols indicating the unit quantities set up by the raising of the tube 42. At the same time that this operation takes place, that is the setting up of the unit quantity indicating mechanism in the bowl, and simultaneously with the raising of the rack 77, the rack 109 is also raised. This rack 109 carries with it the dog 244, which contacts with the end of the lever or arm 243 carried by the shaft 242 raising the arm 243. This causes a depression of the arm 245 carried by the shaft 242 causing it to contact with the end 246 of the lever 247 raising the end 248 thereof, this end being in contact with a pin 238 carried by the weighted lever 239 raises it so that the pin 238 can engage with the tooth or notch 237 formed in one arm of the lever 236, this lever being mounted on the shaft 234, the shaft 234 also carrying the lever 235 which contacts with the cam lever 233.

When the shaft 242 is operated in this manner the cam 370 (Fig. 34) contacts with the roller 369 carried by the lever 364 raising it and through the arm 362, which is pivotally attached to this lever and also to the piston rod 361 extending from the control cylinder 360, the lever 363 is raised until it is brought into the position shown in dotted lines in the figure. This movement also swings the segmental gear 367 into the position shown in Fig. 35 so that the projection lug 371 of this gear can engage with the notch 372 of the trip lever 267. During this movement the bent lever 394 is brought into the position indicated in Fig. 35 so that the pawl 392 will engage with the lever 390.

The device is now ready to have liquid pumped into the bowl. This is done by rocking the handle 19 back and forth thereby operating the liquid pump and supplying liquid to the bowl 4 and simultaneously therewith increasing the air pressure in the air tank 27. This pumping is continued until the liquid in the bowl overflows the dispensing tube 42: from thence it passes out through the residue valve 12 and back into the storage tank. As soon as this overflow occurs the required or predetermined amount of liquid is in the bowl together with the symbols set up indicating the quantity of liquid therein. The nozzle 154 is then inserted in a suitable container and the valve 153 opened by pressing on the knob thereof. This permits air to pass from the air tank 27 through the pipes 152 and 155 and enter the air cylinder 150 forcing the piston rod 147 upward so that it will contact with the roller 139 and raise it, and due to the raising of this roller the lever 138 carrying the pawl 140 is also raised, and by this operation the shaft 134 is operated through a predetermined distance until the pawl 140 releases the shaft when the counterweight on the arm 135A brings the shaft 134 back to its original position.

During this movement the cam 136 operates the sliding bar 158 moving it backward and swinging the pivoted lever 159 so that the shoulder 160 will release the tooth 161 carried by the pivoted lock lever 162 thereby releasing one of the stops 110 which has been previously supported thereby.

Simultaneously with this movement the pawl 166 is also turned causing the projecting finger 167 to contact with the lever 168 and raise it, and during this movement through the various lever connections the serving valve is opened. However, just prior to the opening of the serving valve, the lever 181 is raised releasing the lever 178 so that the residue valve closes. A continued upward movement of the lever 168 brings the pin 174, which is carried by the lever 168, into the recess 175 thus permitting the lever 176 to drop downward and hold the serving valve in open position.

It will also be noted that as soon as the serving has commenced the clutch members have engaged and the ratchet pawl 250 engaged with the ratchet wheel 249 preventing retrograde movement thereof, and due to this it will also lock the setting up mechanism as it will prevent any raising of the dispensing tube 42 until the ratchet pawl 250 has been released from the ratchet wheel 249 which can only be done by printing and issuing a ticket.

As the rack 109 continues to descend the next of the stops will first contact with the pivoted pawl 163 tripping it and thereby causing this pawl to release the lever 176 from the pin so that the serving valve will close thereby preventing any further dispensation of liquid until the valve 153 is again manipulated.

During the operation of the shaft 134 the arm 143, which carries the pin 144, is also raised, causing the arm 145 to swing on its pivot and exert a pull on the link 146. This link in turn exerts a pull on the lever 125 causing it to move so as to bring the clutch member 122 into engagement with the clutch member 122ª. The movement of this lever 125 also causes the head of the pin 251 to pass away from under the inclined arm 252ª of the locking pawl 250 thereby leaving the same free to act.

The pin 253 having been previously released so that the ratchet pawl 250 can engage with the ratchet wheel 249 and simultaneously with this operation the brakeband 257 is released. This permits the clutch to turn in one direction and during this operation the tape or flexible member 261 is wound up on the drum 260 raising the weight 263ª. This winding up continues during the dispensing operation. The speed, at which the dispensing tube 42 together with the various racks descends, is governed by the control 29, this control being operated as aforesaid in a liquid, which is adapted to pass through the calibrated openings 34, the size of these openings governing the descent of the piston 33.

After one liquid unit has been dispensed, the serving valve, as aforementioned, closes. Then in order to dispense an additional quantity unit, the valve 153 must be again manipulated and another quantity unit dispensed. After each dispensation of a quantity unit, the serving valve closes so that no more liquid than a quantity unit can be dispensed at a time. During all of this time the progressive accumulator together with its various connections has been operating and accumulates and computes progressively the amount of unit quantities of liquid dispensed and the total sales price thereof. The totalizer has been moved into engagement with the idler gears so that the printing wheels carried thereby will operate properly and in sequence with the balance of the computing and recording register. This movement of the totalizer is accomplished by reason of the cam tooth 414 engaging with the tooth 415 of the sliding member 408 drawing it forward and operating the cam 404, which in turn raises the toggle levers and permits the locking arm 416 to engage with the tooth 417 holding the totalizer in the position indicated in Fig. 33.

Then when the sale is completed, the release button 200 operating the valve 208 is pressed. This admits air into the cylinder 196 driving the piston rod 189 and plate 188 carried thereby upward and striking the roller 187. The operation of the roller 187 tilts the cam 135 and plate 185 carried thereby thus not only releasing the pivoted lever 159 but simultaneously therewith disengaging the clutch members. The disengagement of the clutch members causes the lever 233 to contact with the arm 235 swinging the lever 236 so as to release the weighted lever 239. This lever in descending first releases the trip lever 266 causing it to move upward and thereby have the pawl 392 to exert pressure against the arm 390. This in turn operates the cam 384 pushing the arms 380 rearward so that the notch 381 will be clear of the pin 382 thereby permitting the arms 377 to drop, they being pulled down by the spring 379 thereby causing the rollers 374 and the resilient member 388 to come in contact with their respective printing rolls or recording registers and thereby print the customer's ticket and the daily sales slip complete.

During this movement, that is the release of the supporting arms 380, the weight of the arms together with the mechanism carried thereby has caused the pins 451 to force the supporting arms 428 forward. Then upon the commencement of the feeding mechanism, which is tripped by means of the projection 249 coming in contact therewith and the action of the coil spring 362A, the bent lever 394 moves forward carrying with it the pawl 430 and placing the ratchet wheel 431 in rotation. This also rotates the ratchet wheels 429, and due to the springs 401ª secured to the arm 401, this arm, which controls the movement of the totalizer, is prevented to swing backward when one of the teeth on the ratchet 429 enters the tooth or notch 426 thus permitting the totalizer roll to strike the platen 420.

A continued movement of this wheel, however, immediately swings the arm 401 into such a position that the latch 416 locks the totalizer roll in neutral position and simultaneously with this movement the wheels 429 also swing the levers 428 in such a manner that their inclined surfaces will bear against the pins 451 and thus raise the arms 377.

Immediately after these arms are raised, the segmental gear 367 meshes with the gear 373 causing the feed roller 374 to rotate and feed the customer's sales slip and the daily record slip forward. During this time the rack 502 has been descending and winding up the daily sales slip and due to the flexible connection between this rack and the pin 504 excessive tension on the slip is prevented.

The operation of the bent lever 394 also manipulates the rewinding of the totalizer slip, the ribbon rewind and the turning of the platen 420, and during the operation of the shaft 121ª the ratchet tooth 414 operates the bar 524 once for each revolution, the device being so geared up that one revolution is equal to a quantity unit dispensed. Therefore, the operation of this bar or lever rocks the arm 523 of the counter 522 so that this will record each quantity unit as it is dispensed.

On the commencement of the next set-up, the pawl 250 is raised releasing the ratchet wheel with which it is engaged and setting the brakeband 257 thereby permitting the weight to descend slowly the distance which it has been raised thereby clearing the computer of all numerals and data and restoring it to zero, as far as the number of liquid quantity units dispensed and the total sales price thereof is concerned. The unit quantity price, however, is not disturbed and the totalizer being in neutral position is not cleared but remains the same until the next operation when additions are made thereto.

The customer's sales strip is provided with a carbon back so that the daily sales slip will be produced simultaneously therewith. In other words, the daily sales slip will be a duplicate original of the customer's sales ticket.

From the foregoing it will be seen that our device is entirely automatic except for the operation of the air valves which control the dispensing and the printing and issuing of the tickets and that there is no way in which the computer can be operated other than by making a set up in the dispensing device and that at no time can more liquid be dispensed than is registered and computed, so that the dispenser cannot favor one customer by giving him an over quantity nor cheat by giving less than a unit quantity because he has no control over the lowering of the dispensing tube through which the liquid is served other than releasing it so that it can commence to descend, its stopping when a unit quantity has been dispensed being automatically controlled. Nor can he serve more than one unit quantity at a time by operating the pump handle 19 because in order to dispense liquid the rack 109 must descend and since it can descend only enough to allow one unit at a time to escape no more than that amount can be dispensed. Then, again in order to issue a ticket the air valve 201 must be operated, which opens the residue valve and locks it in open position so that any excess liquid in the dispensing bowl 4 will be drained into the storage tank and the serving valve cannot be again opened until a new set-up of the tube 42 has been made.

It will be further noted that during the printing and issuing of a sales ticket the residue valve is locked in open position and the dispensing valve locked in closed position and since this operation also causes the dispensing tube to descend to its lowest position thereby draining the bowl 4 into the storage tank we normally have what is known as a dry bowl and a dry serving hose and thus reduce fire hazards to minimum.

It will also be noted that we print on the issued ticket whether the sale is for cash, or charge and also if a miscellaneous sale is made which will designate sales of lubricating oil or accessories, this record however will appear only on the sales ticket and the daily sales record, a corresponding blank being left on the totalizer.

By our expression "dual control" is meant a control which will automatically close the residue valve and open the dispensing valve simultaneously with the commencement of the dispensing operation, and also simultaneously with this operation connect the dispensing device to the accumulating recording register and keep it in such connection until the residue valve is again opened by the issuance of a sales ticket.

Having fully described our invention, what we claim is:—

1. A dispensing device comprising a transparent bowl, means for supplying liquid to said bowl, means for withdrawing successive predetermined unit quantities unit by unit from said bowl, a progressive accumulating recording register for progressively accumulating the total sales price of the unit quantities as they are dispensed, and a dual control mechanism for automatically and simultaneously governing the operation of the dispensing device and the accumulating recording register.

2. A dispensing device comprising a transparent bowl, means for supplying liquid to said bowl, automatically operating means for withdrawing equal successive unit quantities unit by unit from said bowl, there being a pause after each unit dispensation, a progressive accumulating recording register for progressively accumulating the total sales price of the unit quantities as they are dispensed, a dual control mechanism adapted to be automatically placed in operation when dispensing commences for simultaneously governing the operation of the dispensing device and the accumulating recording register, and means for draining the bowl into a storage tank after a sale has been made.

3. A dispensing device comprising a transparent bowl, means for supplying liquid to said bowl, means for withdrawing successive unit quantities from said bowl, a progressive accumulating recording register for progressively accumulating the total sales price of the unit quantities as they are dispensed, a dual control mechanism for simultaneously governing the operation of the dispensing device and the accumulating recording register, means for draining the bowl into a storage tank after a sale has been made, and means for automatically placing said progressive accumulating mechanism out of operation simultaneously with the commencement of the draining of the bowl.

4. A dispensing device comprising a transparent bowl, means for supplying liquid to said bowl, means for predetermining and indicating the number of quantity units in said bowl, means for successively withdrawing liquid from said bowl unit by unit, means for progressively accumulating and computing the total number of units dispensed and the sales price thereof simultaneously with the withdrawing of the liquid units, and a dual control for automatically draining the bowl into a storage tank and simultaneously placing the progressive accumulating means out of operation when the desired number of quantity units have been dispensed.

5. A dispensing device comprising a transparent bowl, means for supplying liquid to said bowl, means for predetermining and indicating the number of quantity units in said bowl, means for successively withdrawing liquid from said bowl unit by unit, a dual control means for progressively accumulating and computing the total number of units dispensed and the sales price thereof simultaneously with the withdrawing of the liquid units, said dual control also automatically draining the bowl into a storage tank and simultaneously therewith placing the progressive accumulating means out of operation when a desired number of quantity units have been dispensed, and means for automatically clearing said progressive accumulating mechanism while a new predetermination and indication of quantity units in the bowl is being made.

6. A dispensing device comprising a base, a standard carried by said base, a transparent bowl carried by said standard, means for supplying liquid to said bowl, a vertically movable dispensing tube carried by said standard and extending into said bowl, means for raising said tube in said bowl for predetermining the quantity of liquid units in said bowl, means for lowering said dispensing tube step by step, means for progressively accumulating and recording the sales price of the units as they are dispensed, means for printing and issuing a sales ticket of the total cost of said dispensed units, and means for preventing further dispensation of liquid after a sales ticket has been issued.

7. A dispensing device comprising a hollow standard supported on a base, a transparent bowl supported by said standard, means located within said standard and operable from without the same for supplying liquid from a storage tank to said bowl, means vertically movable in said bowl for predetermining the number of liquid units to be retained in said bowl, a normally open residue valve for permitting excess liquid to return from said bowl to the storage tank, a dispensing valve, means for opening said dispensing valve and simultaneously closing said residue valve, means for automatically closing said dispensing valve after a unit quantity of liquid has been dispensed, said latter means adapted for sequentially opening said dispensing valve for the withdrawal of an additional quantity unit without opening the residue valve, and means for automatically locking said dispensing valve opening means in closed position while the residue in the bowl is being drained after making a sale.

8. A dispensing device comprising a hollow standard supported on a base, a transparent bowl supported by said standard, means located within said standard and operable from without the same for supplying liquid from a storage tank to said bowl, means vertically movable in said bowl for predetermining the number of liquid units to be retained in said bowl, a normally open residue valve for permitting excess liquid to return from said bowl to the storage tank, a dispensing valve, means for opening said dispensing valve and simultaneously closing said residue valve, means for closing said dispensing valve after a unit quantity of liquid has been dispensed, means for opening said dispensing valve for the withdrawal of an additional quantity unit, means for automatically locking said dispensing valve in closed position while the residue in the bowl is being drained after making a sale, and locking means for preventing further dispensation of liquid until said container has been drained.

9. A dispensing device comprising an adjustable liquid unit measuring mechanism, means for setting said measuring mechanism, a source of liquid supply for said measuring mechanism, means for dispensing said liquid unit by unit, a mechanism for progressively accumulating the sales price of said liquid units as they are dispensed, said progressive accumulating mechanism also producing and issuing a sales check for the total cost of the liquid dispensed, and means whereby any liquid remaining in said device is returned to the source of supply simultaneously with the issuance of the sales ticket.

10. A dispensing device comprising an adjustable liquid unit measuring mechanism, means for setting said measuring mechanism at a predetermined quantity, a source of supply for said measuring mechanism, means for dispensing said liquid unit by unit, a mechanism for progressively accumulating the sales price of said units as they are dispensed, said progressive accumulating mechanism also producing and issuing a sales check for the total cost of the liquid units dispensed, means whereby any liquid remaining in said device is returned to the source of supply simultaneously with the issuance of the sales ticket, and means operated simultaneously with the progressive accumulating mechanism for successively registering the total number of liquid units dispensed.

11. A dispensing device comprising an adjustable liquid unit measuring mechanism, means for setting said measuring mechanism at a predetermined quantity of liquid units, a source of liquid supply for said measuring mechanism, means for dispensing said liquid unit by unit, a mechanism for progressively accumulating the sales price of said liquid units as they are dispensed, said progressive accumulating mechanism also producing and issuing a sales check for the total cost of the liquid units dispensed, means whereby any liquid remaining in said device is returned to the source of supply simultaneously with the issuance of the sales ticket, and means for automatically clearing said progressive accumulating mechanism before a new set-up can be made.

12. A dispensing device comprising a hollow standard support on a base, a transparent bowl supported on said standard by said standard, means located within said standard and operatable from without the same for supplying liquid from a storage tank to said bowl, means movable in said bowl for predetermining the number of liquid units supplied to said bowl, a normally open residue valve for permitting excess liquid to return from said bowl to the storage tank, a dispensing valve, means for opening said dispensing valve and simultaneously closing said residue valve, means for closing said dispensing valve after a unit quantity of liquid has been dispensed, means for opening said dispensing valve for the withdrawal of an additional quantity unit, pivot quantity symbols located in said bowl for indicating the predetermined number of quantity units therein, means for lowering said symbols as the liquid is dispensed, means for preventing the lowering of the remaining symbols in said bowl in the event of all the liquid units therein are not dispensed while the bowl is being drained, and means for automatically locking said dispensing valve opening, means in closed position while the residue in the bowl is being drained.

13. The device of claim 4 in which, means is provided for preventing a change in the predetermination of quantity units supplied to the bowl after dispensing has been commenced.

14. The device of claim 5 in which, means are provided for preventing a change in the predetermination of liquid units within the bowl after dispensing has commenced.

15. A dispensing device comprising a transparent bowl, means for supplying a predetermined amount of liquid to said bowl, means for withdrawing successive unit quantities from said bowl, unit by unit, a progressive accumulating recording register for progressively accumulating and printing the total sales price of the unit quantities dispensed, automatically operated dual control mechanism for simultaneously governing the operation of the dispensing device and the accumulating register during the withdrawal of liquid, and means carried by the accumulating recording register for printing the character of sale made.

16. The device of claim 15 in which, means is provided for automatically returning the character of sale indicating means to its starting position after the character of sale has been printed.

17. The dispensing device of claim 6 in which, means is provided for simultaneously indicating on the sales ticket the character of sale made.

18. A dispensing device comprising a transparent bowl, means for supplying liquid to said bowl, means for automatically withdrawing successive unit quantities from said bowl, unit by unit, there being a pause after each unit dispensation, a progressive accumulating recording register for progressively accumulating the total sales price of the unit quantities as they are dispensed, a dual control mechanism adapted to be placed in operation automatically when the withdrawal of liquid commences for simultaneously governing the operation of the dispensing device and the accumulating recording register, and means carried by the progressive accumulating recording register for indicating the total number of quantity units dispensed.

In testimony whereof we have affixed our signatures.

GEORGE S. COX.
HARRY J. ALMSTEDT.